(12) United States Patent
Ren et al.

(10) Patent No.: US 11,038,644 B2
(45) Date of Patent: Jun. 15, 2021

(54) DATA COMMUNICATION METHOD, NETWORK DEVICE, AND TERMINAL DEVICE

(71) Applicant: Huawei Technologies Co., Ltd., Shenzhen (CN)

(72) Inventors: Haibao Ren, Shanghai (CN); Yi Huang, Shenzhen (CN); Longbao Wang, Wuhan (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 16/579,413

(22) Filed: Sep. 23, 2019

(65) Prior Publication Data

US 2020/0021411 A1 Jan. 16, 2020

Related U.S. Application Data

(63) Continuation of application No. PCT/CN2018/079412, filed on Mar. 19, 2018.

(30) Foreign Application Priority Data

Mar. 24, 2017 (CN) .......................... 201710184023.6
Aug. 11, 2017 (CN) .......................... 201710685195.1

(51) Int. Cl.
*H04L 5/00* (2006.01)
*H04B 7/0413* (2017.01)
*H04L 1/00* (2006.01)

(52) U.S. Cl.
CPC ......... *H04L 5/0048* (2013.01); *H04B 7/0413* (2013.01); *H04L 1/0006* (2013.01); *H04L 1/0057* (2013.01)

(58) Field of Classification Search
CPC ... H04L 5/0048; H04L 1/0006; H04L 1/0057; H04L 5/0023; H04L 1/0061; H04L 1/02;
(Continued)

(56) References Cited

U.S. PATENT DOCUMENTS

2009/0077456 A1 3/2009 Pi et al.
2010/0303034 A1 12/2010 Chen et al.
(Continued)

FOREIGN PATENT DOCUMENTS

CN 101615986 A 12/2009
CN 102088429 A 6/2011
(Continued)

*Primary Examiner* — Afshawn M Towfighi
(74) *Attorney, Agent, or Firm* — Slater Matsil, LLP

(57) ABSTRACT

Embodiments of this application provide a data transmission method, a network device, and a terminal device. The method includes: determining, by a network device, demodulation reference signal DMRS port groups, where a quantity of the DMRS port groups is greater than or equal to 2; and further, communicating, by the network device, data with a terminal device, where the data is corresponding to a transport block, the transport block is divided into at least one code block group CBG, and each of the at least one CBG is corresponding to one DMRS port group and is mapped to a transport layer corresponding to the one DMRS port group.

20 Claims, 7 Drawing Sheets

(58) Field of Classification Search
CPC ............... H04L 5/0051; H04L 41/0853; H04L 41/0806; H04L 41/0893; H04L 1/0056; H04L 41/085; H04B 7/0413; H04B 1/711; H04J 11/0036
See application file for complete search history.

(56) References Cited

U.S. PATENT DOCUMENTS

| | | |
|---|---|---|
| 2012/0275414 A1 | 11/2012 | Hu et al. |
| 2012/0300670 A1 | 11/2012 | Sun et al. |
| 2012/0300709 A1 | 11/2012 | Su et al. |
| 2014/0314038 A1* | 10/2014 | Seo .................... H04L 25/0226 370/329 |
| 2015/0049704 A1 | 2/2015 | Park et al. |
| 2015/0223216 A1 | 8/2015 | Han et al. |
| 2015/0230213 A1* | 8/2015 | Kim .................... H04L 27/2626 370/329 |
| 2017/0222860 A1* | 8/2017 | Noh ....................... H04L 27/38 |

FOREIGN PATENT DOCUMENTS

| | | |
|---|---|---|
| CN | 102158319 A | 8/2011 |
| CN | 103687042 A | 3/2014 |
| CN | 107342852 A | 11/2017 |
| EP | 3451736 A1 | 3/2019 |
| WO | 2010098532 A1 | 9/2010 |
| WO | 2011011566 A2 | 1/2011 |

* cited by examiner

DATA COMMUNICATION METHOD, NETWORK DEVICE, AND TERMINAL DEVICE

CROSS-REFERENCE TO RELATED APPLICATIONS

This application is a continuation of International Application No. PCT/CN2018/079412, filed on Mar. 19, 2018, which claims priority to Chinese Patent Application No. 201710184023.6, filed on Mar. 24, 2017 and Chinese Patent Application No. 201710685195.1, filed on Aug. 11, 2017. The disclosures of the aforementioned applications are hereby incorporated by reference in their entireties.

TECHNICAL FIELD

This application relates to communications technologies, and in particular, to a data communication method, a network device, and a terminal device.

BACKGROUND

A multiple-input multiple-output (MIMO) technology means that a plurality of transmit antennas and receive antennas are used at each of a transmit end and a receive end, so that a communication signal is transmitted and received through a plurality of antennas at the transmit end and the receive end, to improve communication quality. In the MIMO technology, spatial resources can be fully utilized, and multiple-input multiple-output is implemented by using a plurality of antennas. Therefore, a system channel capacity can be increased by times without increasing spectrum resources and antenna transmit power. The MIMO technology presents a significant advantage and is considered as a core technology for next-generation mobile communications.

However, LTE currently supports only MIMO communication corresponding to one demodulation reference signal (DMRS) antenna port group (antenna ports belonging to a same DMRS port group satisfy a QCL relationship). For MIMO communication corresponding to a plurality of DMRS port groups (antenna ports belonging to different DMRS port groups do not satisfy a QCL relationship), because joint precoding cannot be performed on DMRS ports in the groups, there is severe inter-layer interference between different data flows sent through DMRS ports belonging to different groups. To reduce inter-layer interference, an interference cancellation receiver is disposed in a terminal device, but a precondition for supporting the interference cancellation receiver by the terminal device is that data flows mapped to different transport layers can be independently decoded; otherwise, interference cannot be canceled. Therefore, how to independently decode data flows mapped to different transport layers is a technical problem to be resolved in this application.

SUMMARY

Embodiments of this application provide a data communication method, a network device, and a terminal device, to independently decode data flows mapped to different transport layers.

According to a first aspect, an embodiment of this application provides a data communication method, including: determining, by a network device, demodulation reference signal DMRS port groups, where a quantity of the DMRS port groups is greater than or equal to 2; and communicating, by the network device, data with a terminal device, where the data is corresponding to a transport block, the transport block is divided into at least one code block group CBG, and each of the at least one CBG is corresponding to one DMRS port group and is mapped to a transport layer corresponding to the one DMRS port group.

According to the data communication method provided in the first aspect, the network device communicates the data with the terminal device, where the data is corresponding to the transport block, the transport block is divided into the at least one code block group CBG, and each of the at least one CBG is corresponding to one DMRS port group and is mapped to a transport layer corresponding to the one DMRS port group. It can be learned that, it is ensured that data flows sent through different DMRS port groups belong to different CBGs, so that the terminal device can independently decode a CBG corresponding to each DMRS port group, in other words, can independently decode data flows mapped to different transport layers, and therefore can support interference cancellation performed by an interference cancellation receiver.

In a possible design, that the transport block is divided into at least one CBG includes: the transport block with an added redundancy check bit is divided into N code blocks CBs, where $N=\lceil B/c \rceil$, B represents a total quantity of bits of the transport block with the added redundancy check bit, c represents a preset value, and $\lceil \ \rceil$ represents a round-up operation; and the N CBs are grouped into CBGs corresponding to the DMRS port groups.

In a possible design, a quantity of CBs included in each CBG is equal to a value calculated based on the following formula: $\lfloor (B_0/B_s) \times N \rfloor$ or $\lceil (B_0/B_s) \times N \rceil$, where $B_0$ represents a quantity of bits of data sent through a DMRS port group corresponding to the CBG, $B_s$ represents a total quantity of bits of data sent through the DMRS port groups, $\lfloor \ \rfloor$ represents a round-down operation, and $\lceil \ \rceil$ represents a round-up operation.

In a possible design, that the transport block is divided into at least one CBG includes: the transport block is divided into a transport sub-block corresponding to each DMRS port group; and each transport sub-block is encoded to obtain a CBG corresponding to the DMRS port group.

In a possible design, the method further includes: sending, by the network device, a notification message to the terminal device, where the notification message carries configuration information of the DMRS port groups.

In a possible design, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

In a possible design, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence comprised in the CBG corresponding to each DMRS port group and performing serial concatenation on the first Qi data bits, where Qi represents a quantity of data bits extracted from a data bit sequence included in a CBG corresponding to an $i^{th}$ DMRS port group, $1 \leq i \leq R$, is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where $2 \leq k \leq m$, and the remaining data bit sequence included in the CBG corresponding to the DMRS port group includes a data bit that remains after data bit extraction is performed k−1 times on the data bit sequence included in the CBG corresponding to the DMRS port group.

According to a second aspect, an embodiment of this application provides a data communication method, including: obtaining, by a terminal device, configuration information of demodulation reference signal DMRS port groups, where a quantity of the DMRS port groups is greater than or equal to 2; and communicating, by the terminal device, data with a network device, where the data is corresponding to a transport block, the transport block is divided into at least one code block group CBG, and each of the at least one CBG is corresponding to one DMRS port group and is mapped to a transport layer corresponding to the one DMRS port group.

According to the data transmission method provided in the second aspect, the terminal device communicates the data with the network device, where the data is corresponding to the transport block, the transport block is divided into the at least one code block group CBG, and each of the at least one CBG is corresponding to one DMRS port group and is mapped to a transport layer corresponding to the one DMRS port group. It can be learned that, it is ensured that data flows sent through different DMRS port groups belong to different CBGs, so that the network device can independently decode a CBG corresponding to each DMRS port group, in other words, can independently decode data flows mapped to different transport layers.

In a possible design, that the transport block is divided into at least one CBG includes: the transport block with an added redundancy check bit is divided into N code blocks CBs, where $N = \lceil B/c \rceil$, B represents a total quantity of bits of the transport block with the added redundancy check bit, c represents a preset value, and $\lceil \ \rceil$ represents a round-up operation; and the N CBs are grouped into CBGs corresponding to the DMRS port groups.

In a possible design, a quantity of CBs included in each CBG is equal to a value calculated based on the following formula: $\lfloor (B_0/B_s) \times N \rfloor$ or $\lceil (B_0/B_s) \times N \rceil$, where $B_0$ represents a quantity of bits of data sent through a DMRS port group corresponding to the CBG, $B_s$ represents a total quantity of bits of data sent through the DMRS port groups, $\lfloor \ \rfloor$ represents a round-down operation, and $\lceil \ \rceil$ represents a round-up operation.

In a possible design, that the transport block is divided into at least one CBG includes: the transport block is divided into a transport sub-block corresponding to each DMRS port group; and each transport sub-block is encoded to obtain a CBG corresponding to the DMRS port group.

In a possible design, the obtaining, by a terminal device, configuration information of demodulation reference signal DMRS port groups includes: receiving, by the terminal device, a notification message sent by the network device, where the notification message carries the configuration information of the DMRS port groups.

In a possible design, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

In a possible design, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, $1 \leq i \leq R$, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where $2 \leq k \leq m$, and the remaining data bit sequence included in the CBG corresponding to the DMRS port group includes a data bit that remains after data bit extraction is performed k−1 times on the data bit sequence included in the CBG corresponding to the DMRS port group.

According to a third aspect, an embodiment of this application provides a network device, including: a determining module, configured to determine demodulation reference signal DMRS port groups, where a quantity of the DMRS port groups is greater than or equal to 2; and a communication module, configured to communicate data with a terminal device, where the data is corresponding to a transport block, the transport block is divided into at least one code block group CBG, and each of the at least one CBG is corresponding to one DMRS port group and is mapped to a transport layer corresponding to the one DMRS port group.

In a possible design, that the transport block is divided into at least one CBG includes: the transport block with an added redundancy check bit is divided into N code blocks CBs, where N=⌈B/c⌉, B represents a total quantity of bits of the transport block with the added redundancy check bit, c represents a preset value, and ⌈ ⌉ represents a round-up operation; and the N CBs are grouped into CBGs corresponding to the DMRS port groups.

In a possible design, a quantity of CBs included in each CBG is equal to a value calculated based on the following formula: ⌊$(B_0/B_s) \times N$⌋ or ⌈$(B_0/B_s) \times N$⌉, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

In a possible design, that the transport block is divided into at least one CBG includes: the transport block is divided into a transport sub-block corresponding to each DMRS port group; and each transport sub-block is encoded to obtain a CBG corresponding to the DMRS port group.

In a possible design, the network device further includes: a notification module, configured to send a notification message to the terminal device, where the notification message carries configuration information of the DMRS port groups.

In a possible design, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

In a possible design, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

For a beneficial effect of the network device provided in the implementations of the third aspect, refer to the beneficial effect of the possible implementations of the first aspect. Details are not described herein again.

According to a fourth aspect, an embodiment of this application provides a terminal device, including: an obtaining module, configured to obtain configuration information of demodulation reference signal DMRS port groups, where a quantity of the DMRS port groups is greater than or equal to 2; and a communication module, configured to communicate data with a network device, where the data is corresponding to a transport block, the transport block is divided into at least one code block group CBG, and each of the at least one CBG is corresponding to one DMRS port group and is mapped to a transport layer corresponding to the one DMRS port group.

In a possible design, that the transport block is divided into at least one CBG includes: the transport block with an added redundancy check bit is divided into N code blocks CBs, where N=⌈B/c⌉, B represents a total quantity of bits of the transport block with the added redundancy check bit, c represents a preset value, and ⌈ ⌉ represents a round-up operation; and the N CBs are grouped into CBGs corresponding to the DMRS port groups.

In a possible design, a quantity of CBs included in each CBG is equal to a value calculated based on the following formula: ⌊$(B_0/B_s) \times N$⌋ or ⌈$(B_0/B_s) \times N$⌉, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

In a possible design, that the transport block is divided into at least one CBG includes: the transport block is divided into a transport sub-block corresponding to each DMRS port group; and each transport sub-block is encoded to obtain a CBG corresponding to the DMRS port group.

In a possible design, the obtaining module is specifically configured to receive a notification message sent by the network device, where the notification message carries the configuration information of the DMRS port groups.

In a possible design, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

In a possible design, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

For a beneficial effect of the terminal device provided in the implementations of the fourth aspect, refer to the beneficial effect of the possible implementations of the second aspect. Details are not described herein again.

A fifth aspect of this application provides a network device, including a memory, a processor, and a transceiver, where the memory is configured to store a program instruction; the processor is configured to invoke the program instruction in the memory to perform the following step: determining demodulation reference signal DMRS port groups, where a quantity of the DMRS port groups is greater than or equal to 2; and the transceiver is configured to communicate data with a terminal device, where the data is corresponding to a transport block, the transport block is divided into at least one code block group CBG, and each of the at least one CBG is corresponding to one DMRS port group and is mapped to a transport layer corresponding to the one DMRS port group.

In a possible design, that the transport block is divided into at least one CBG includes: the transport block with an added redundancy check bit is divided into N code blocks CBs, where N=⌈B/c⌉, B represents a total quantity of bits of the transport block with the added redundancy check bit, c represents a preset value, and ⌈ ⌉ represents a round-up operation; and the N CBs are grouped into CBGs corresponding to the DMRS port groups.

In a possible design, a quantity of CBs included in each CBG is equal to a value calculated based on the following formula: ⌊($B_0/B_s$)×N⌋ or ⌈($B_0/B_s$)×N⌉, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

In a possible design, that the transport block is divided into at least one CBG includes: the transport block is divided into a transport sub-block corresponding to each DMRS port group; and each transport sub-block is encoded to obtain a CBG corresponding to the DMRS port group.

In a possible design, the transceiver is further configured to send a notification message to the terminal device, where the notification message carries configuration information of the DMRS port groups.

In a possible design, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

In a possible design, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

For a beneficial effect of the network device provided in the implementations of the fifth aspect, refer to the beneficial effect of the possible implementations of the first aspect. Details are not described herein again.

A sixth aspect of this application provides a network device, including at least one processing element (or chip) configured to perform the method in the first aspect.

A seventh aspect of this application provides a program. When being executed by a processor, the program is used to perform the method in the first aspect.

An eighth aspect of this application provides a program product, for example, a computer readable storage medium, including the program in the seventh aspect.

A ninth aspect of this application provides a computer readable storage medium. The computer readable storage medium stores an instruction. When the instruction runs on a computer, the computer is enabled to perform the method in the first aspect.

A tenth aspect of this application provides a terminal device, including a memory, a processor, and a transceiver, where the memory is configured to store a program instruction; the processor is configured to invoke the program instruction in the memory to perform the following step: obtaining configuration information of demodulation reference signal DMRS port groups, where a quantity of the DMRS port groups is greater than or equal to 2; and the transceiver is configured to communicate data with a network device, where the data is corresponding to a transport block, the transport block is divided into at least one code block group CBG, and each of the at least one CBG is corresponding to one DMRS port group and is mapped to a transport layer corresponding to the one DMRS port group.

In a possible design, that the transport block is divided into at least one CBG includes: the transport block with an added redundancy check bit is divided into N code blocks CBs, where N=⌈B/c⌉, B represents a total quantity of bits of the transport block with the added redundancy check bit, C represents a preset value, and ⌈ ⌉ represents a round-up operation; and the N CBs are grouped into CBGs corresponding to the DMRS port groups.

In a possible design, a quantity of CBs included in each CBG is equal to a value calculated based on the following formula: ⌊($B_0/B_s$)×N⌋ or ⌈($B_0/B_s$)×N⌉, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

In a possible design, that the transport block is divided into at least one CBG includes: the transport block is divided into a transport sub-block corresponding to each DMRS port group; and each transport sub-block is encoded to obtain a CBG corresponding to the DMRS port group.

In a possible design, the transceiver is further configured to receive a notification message sent by the network device, where the notification message carries the configuration information of the DMRS port groups. Correspondingly, the processor is specifically configured to obtain the configuration information of the DMRS port groups based on the notification message.

In a possible design, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

In a possible design, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

For a beneficial effect of the terminal device provided in the implementations of the tenth aspect, refer to the beneficial effect of the possible implementations of the second aspect. Details are not described herein again.

An eleventh aspect of this application provides a terminal device, including at least one processing element (or chip) configured to perform the method in the second aspect.

A twelfth aspect of this application provides a program. When being executed by a processor, the program is used to perform the method in the second aspect.

A thirteenth aspect of this application provides a program product, for example, a computer readable storage medium, including the program in the twelfth aspect.

A fourteenth aspect of this application provides a computer readable storage medium. The computer readable storage medium stores an instruction. When the instruction runs on a computer, the computer is enabled to perform the method in the second aspect.

A fifteenth aspect of this application provides a data communication method, including: determining, by a network device, a quantity of transport layers; and communicating, by the network device, data with a terminal device, where the data is corresponding to a transport block, and the transport block is mapped to a corresponding transport layer based on the quantity of transport layers.

According to the data communication method provided in the fifteenth aspect, the network device communicates the data with the terminal device, where the data is corresponding to the transport block, and the transport block is mapped to the corresponding transport layer based on the quantity of transport layers. It can be learned that flexible resource mapping can be implemented based on different quantities of transport layers, to adapt to different service requirements, different transmission scenarios, different channel statuses, or the like.

In a possible design, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, the transport block is divided into two code block groups CBGs, and the two CBGs are mapped to different transport layers.

In a possible design, the method further includes: determining, by the network device based on that a difference between channel quantity information corresponding to different DMRS ports is greater than a preset threshold, to divide the transport block when the quantity of transport layers is equal to 3 or 4.

In a possible design, the method further includes: sending, by the network device, a group configuration message to the terminal device, where the group configuration message is used to instruct to divide the transport block when the quantity of transport layers is equal to 3 or 4.

A sixteenth aspect of this application provides a data communication method, including: obtaining, by a terminal device, a quantity of transport layers; and communicating, by the terminal device, data with a network device, where the data is corresponding to a transport block, and the transport block is mapped to a corresponding transport layer based on the quantity of transport layers.

According to the data communication method provided in the sixteenth aspect, the terminal device communicates the data with the network device, where the data is corresponding to the transport block, and the transport block is mapped to the corresponding transport layer based on the quantity of transport layers. It can be learned that flexible resource mapping can be implemented based on different quantities of transport layers, to adapt to different service requirements, different transmission scenarios, different channel statuses, or the like.

In a possible design, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, and a group configuration message is used to instruct to divide the transport block, the transport block is divided into two code block groups CBGs, and the two CBGs are mapped to different transport layers.

In a possible design, the method further includes: receiving, by the terminal device, the group configuration message sent by the network device.

According to a seventeenth aspect, an embodiment of this application provides a network device, including: a determining module, configured to determine a quantity of transport layers; and a transmission module, configured to communicate data with a terminal device, where the data is corresponding to a transport block, and the transport block is mapped to a corresponding transport layer based on the quantity of transport layers.

In a possible design, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, the transport block is divided into two code block groups CBGs, and the two CBGs are mapped to different transport layers.

In a possible design, the network device further includes: the determining module, configured to determine, based on that a difference between channel quantity information corresponding to different DMRS ports is greater than a preset threshold, to divide the transport block when the quantity of transport layers is equal to 3 or 4.

In a possible design, the network device further includes: a sending module, configured to send a group configuration message to the terminal device, where the group configuration message is used to instruct to divide the transport block when the quantity of transport layers is equal to 3 or 4.

For a beneficial effect of the network device provided in the implementations of the seventeenth aspect, refer to the beneficial effect of the possible implementations of the fifteenth aspect. Details are not described herein again.

According to an eighteenth aspect, an embodiment of this application provides a terminal device, including: an obtaining module, configured to obtain a quantity of transport layers; and a communication module, configured to communicate data with a network device, where the data is corresponding to a transport block, and the transport block is mapped to a corresponding transport layer based on the quantity of transport layers.

In a possible design, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, and a group configuration message is used to instruct to divide the transport block, the transport block is divided into two code block groups CBGs, and the two CBGs are mapped to different transport layers.

In a possible design, the terminal device further includes: a receiving module, configured to receive the group configuration message sent by the network device.

For a beneficial effect of the terminal device provided in the implementations of the eighteenth aspect, refer to the beneficial effect of the possible implementations of the sixteenth aspect. Details are not described herein again.

A nineteenth aspect of this application provides a network device, including a memory, a processor, and a transceiver, where the memory is configured to store a program instruction; the processor is configured to invoke the program instruction in the memory to perform the following step: determining a quantity of transport layers; and the transceiver is configured to communicate data to a terminal device, where the data is corresponding to a transport block, and the transport block is mapped to a corresponding transport layer based on the quantity of transport layers.

In a possible design, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, the transport block is divided into two code block groups CBGs, and the two CBGs are mapped to different transport layers.

In a possible design, the processor is further configured to determine, based on that a difference between channel quantity information corresponding to different DMRS ports is greater than a preset threshold, to divide the transport block when the quantity of transport layers is equal to 3 or 4.

In a possible design, the transceiver is further configured to send a group configuration message to the terminal device, where the group configuration message is used to instruct to divide the transport block when the quantity of transport layers is equal to 3 or 4.

For a beneficial effect of the network device provided in the implementations of the nineteenth aspect, refer to the beneficial effect of the possible implementations of the fifteenth aspect. Details are not described herein again.

A twentieth aspect of this application provides a network device, including at least one processing element (or chip) configured to perform the method in the fifteenth aspect.

A twenty-first aspect of this application provides a program. When being executed by a processor, the program is used to perform the method in the fifteenth aspect.

A twenty-second aspect of this application provides a program product, for example, a computer readable storage medium, including the program in the twenty-first aspect.

A twenty-third aspect of this application provides a computer readable storage medium. The computer readable storage medium stores an instruction. When the instruction runs on a computer, the computer is enabled to perform the method in the fifteenth aspect.

A twenty-fourth aspect of this application provides a terminal device, including a memory, a processor, and a transceiver, where the memory is configured to store a program instruction; the processor is configured to invoke the program instruction in the memory to perform the following step: obtaining a quantity of transport layers; and the transceiver is configured to communicate data with a network device, where the data is corresponding to a transport block, and the transport block is mapped to a corresponding transport layer based on the quantity of transport layers.

In a possible design, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, and a group configuration message is used to instruct to divide the transport block, the transport block is divided into two code block groups CBGs, and the two CBGs are mapped to different transport layers.

In a possible design, the transceiver is further configured to receive the group configuration message sent by the network device.

For a beneficial effect of the terminal device provided in the implementations of the twenty-fourth aspect, refer to the beneficial effect of the possible implementations of the sixteenth aspect. Details are not described herein again.

A twenty-fifth aspect of this application provides a terminal device, including at least one processing element (or chip) configured to perform the method in the sixteenth aspect.

A twenty-sixth aspect of this application provides a program. When being executed by a processor, the program is used to perform the method in the sixteenth aspect.

A twenty-seventh aspect of this application provides a program product, for example, a computer readable storage medium, including the program in the twenty-sixth aspect.

A twenty-eighth aspect of this application provides a computer readable storage medium. The computer readable storage medium stores an instruction. When the instruction runs on a computer, the computer is enabled to perform the method in the sixteenth aspect.

DETAILED DESCRIPTION OF ILLUSTRATIVE EMBODIMENTS

First, a communications system and some terms included in the embodiments of this application are described.

Figure 1:
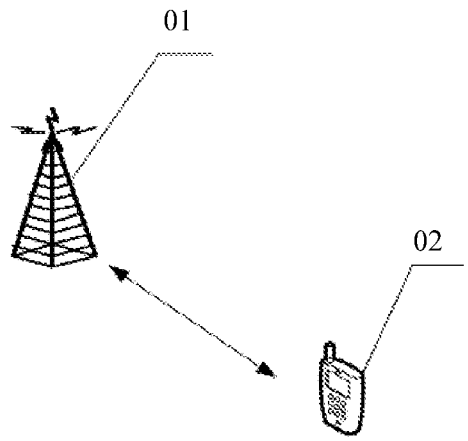
FIG. 1 is a framework diagram of a communications system.

FIG. 1 is a framework diagram of a communications system. As shown in FIG. 1, the communications system includes a network device 01 and a terminal device 02. Optionally, the communications system may be a long term evolution (LTE) communications system, or a $5^{th}$ generation (5G) mobile communications system, for example, a new generation (New Radio, NR) radio access technology. This is not limited herein.

The network device included in this application may include but is not limited to a base station and a transmission reception point (TRP). The base station is also referred to as a radio access network (RAN) device, and is a device that connects a terminal to a wireless network. The base station may be a base transceiver station (BTS) in global system for mobile communications (GSM) or code division multiple access (CDMA); or may be a NodeB (NB) in wideband code division multiple access (WCDMA); or may be an evolved NodeB (eNB or eNodeB) in long term evolution (LTE), a relay station, an access point, a base station on a future 5G network, or the like. This is not limited herein.

The terminal device may be a wireless terminal or a wired terminal. The wireless terminal may be a device that provides voice and/or other service data connectivity for a user, a handheld device with a wireless connection function, or another processing device connected to a wireless modem. The wireless terminal may communicate with one or more core networks through a radio access network (RAN). The wireless terminal may be a mobile terminal, for example, a mobile phone (also referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device or user equipment. This is not limited herein.

In the embodiments of this application, a DMRS port is an antenna port used to send a DMRS. The antenna port is also used to send a physical data channel or a physical control channel. The DMRS sent through the antenna port may be used to perform channel estimation and signal demodulation on the physical data channel or the physical control channel sent through the antenna port. A DMRS port, a DMRS antenna port, and the like are not differentiated in the embodiments of this application, and are corresponding to a same meaning.

In the embodiments of this application, DMRS ports in a DMRS port group meet a quasi-co-location (QCL) requirement, and two DMRS ports belonging to different DMRS port groups do not meet the QCL requirement. Usually, if a large scale feature corresponding to a channel that a signal sent through an antenna port goes through can be obtained based on a large scale feature corresponding to a channel that a signal sent through another antenna port goes through, it is considered that these two antenna ports meet the QCL requirement. The large scale feature includes but is not limited to delay spread, an average delay, average power, Doppler spread, a Doppler shift, and spatial information (for example, an angle of arrival and a receive antenna correlation).

In the embodiments of this application, the network device may be configured to perform coherent MIMO communication (that is, DMRS ports corresponding to different antenna panels in the network device belong to a same DMRS port group, or DMRS ports corresponding to the network device and another network device belong to a same DMRS port group), or may be configured to perform non-coherent MIMO communication (that is, DMRS ports corresponding to different antenna panels in the network device belong to different DMRS port groups, or DMRS ports corresponding to the network device and another network device belong to different DMRS port groups). The following embodiment part separately describes the two scenarios.

In the embodiments of this application, a process of mapping a CBG or a transport block to a corresponding transport layer further includes but is not limited to the following process: sequentially performing processes such as scrambling, modulation, and layer mapping on the CBG or the transport block. Specifically, for implementation processes of scrambling, modulation, and layer mapping, refer to the following processes in the version 12.5.0 (v12.5.0) of the $3^{rd}$ generation partnership project (3GPP) long term evolution (LTE) system technical specification (TS) 36.211: a physical uplink shared channel scrambling process in the section 5.3.1, physical uplink shared channel modulation and layer mapping processes in the section 5.3.2, a physical downlink shared channel scrambling process in the section 6.3.1, a physical downlink shared channel modulation process in the section 6.3.2, and a layer mapping process during spatial multiplexing transmission of a physical downlink shared channel in the section 6.3.3.2. Details are not described herein. It can be understood that the process of mapping a CBG or transport block to a corresponding transport layer may be alternatively performed in another existing manner or a future manner. This is not limited in the embodiments of this application.

In the embodiments of this application, a mapping relationship between a DMRS port group and a corresponding transport layer is predefined in the network device and/or the terminal device, or the network device dynamically configures, by using a higher layer message or a physical layer message, a mapping relationship, between a DMRS port group and a corresponding transport layer, in the network device and/or the terminal device, so that a transport layer to which data corresponding to a DMRS port group is mapped can be learned of when the DMRS port group is learned of. In the embodiments of this application, one antenna port is used to send a data flow corresponding to one transport layer. Therefore, it can be considered that a transport layer and an antenna port are in a one-to-one mapping relationship. In the embodiments of this application, a transport layer and an antenna port may not be differentiated, and may be considered as equivalent based on a mapping relationship.

By using specific embodiments, the following describes in detail a data communication method, a network device, and a terminal device provided in the embodiments of this application.

Figure 2A:
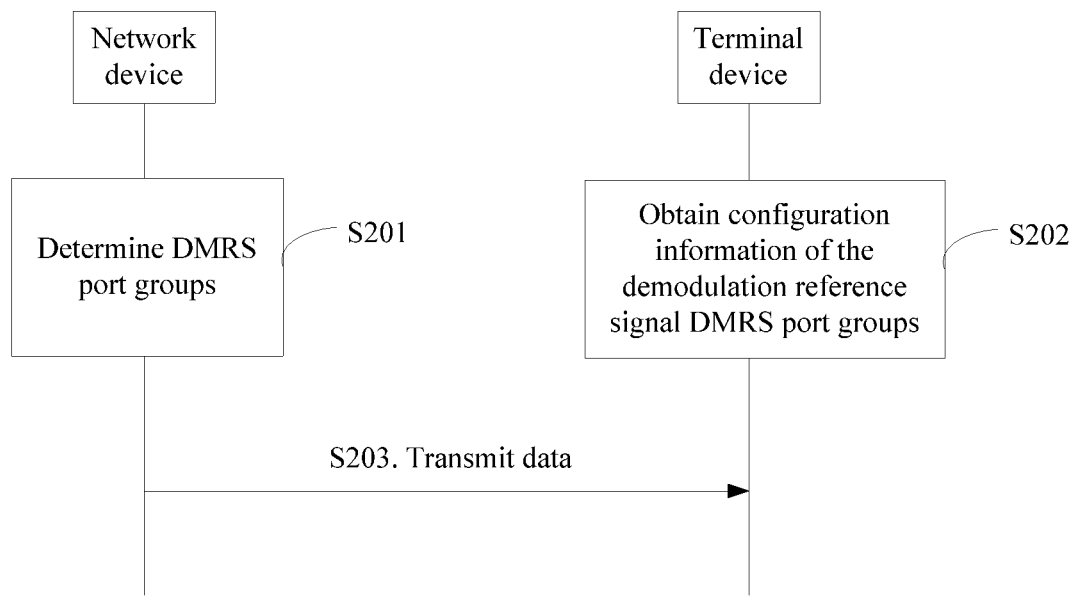
FIG. 2A is a schematic flowchart of Embodiment 1 of a data communication method according to this application.

FIG. 2A is a schematic flowchart of Embodiment 1 of a data communication method according to this application. This embodiment of this application describes non-coherent MIMO communication (that is, there is a plurality of DMRS antenna port groups). As shown in FIG. 2A, the method in this embodiment may include the following steps.

Step S201: A network device determines DMRS port groups.

In this step, the network device determines the DMRS port groups used by the network device to communicate data with a terminal device. Optionally, a quantity of the DMRS port groups is greater than or equal to 2. Optionally, the network device performs user scheduling and resource allocation with reference to network load and an interference status and based on channel state information fed back by the terminal device, an uplink sounding reference signal sent by the terminal device, or the like, to determine the DMRS port groups used by the network device to communicate data with the terminal device. Certainly, the network device may alternatively determine the DMRS port groups in another manner. This is not limited in this embodiment of this application.

Step S202: A terminal device obtains configuration information of the demodulation reference signal DMRS port groups.

In this step, manners of obtaining, by the terminal device, the configuration information of the DMRS port groups may include but are not limited to the following manners: receiving, by the terminal device, a notification message (optionally, the notification message carries the configuration information of the DMRS port groups, and information about antenna ports included in the DMRS port groups) sent by the network device; or obtaining, by the terminal device, predefined configuration information of the DMRS port groups. Optionally, the notification message may include but is not limited to any one of or a combination of the following: downlink control information (DCI), a radio resource control (RRC) message, and a media access control control element (MAC CE).

Step S203: The network device and the terminal device perform data communication.

The data is corresponding to a transport block. The transport block is divided into at least one code block group CBG. Each of the at least one CBG is corresponding to one DMRS port group (that is, different DMRS port groups are corresponding to different CBGs, and one CBG is not corresponding to a plurality of DMRS port groups) and is mapped to a transport layer corresponding to the one DMRS port group.

In this step, (1) for downlink data transmission, the network device sends data to the terminal device, where the data is corresponding to a transport block, (TB). The network device divides the transport block into at least one code block group CBG. Each of the at least one CBG is corresponding to one DMRS port group (that is, different DMRS port groups are corresponding to different CBGs, and one CBG is not corresponding to a plurality of DMRS port groups), and each of the at least one CBG is mapped to a transport layer corresponding to the one DMRS port group. For example, the network device determines that the DMRS port groups include a DMRS port group 1 and a DMRS port group 2 (that is, the quantity of the DMRS port groups is equal to 2). In this case, the transport block is divided into two CBGs (including a CBG 1 corresponding to the DMRS port group 1 and a CBG 2 corresponding to the DMRS port group 2), and the CBG 1 is mapped to a transport layer corresponding to the DMRS port group 1, and the CBG 2 is mapped to a transport layer corresponding to the DMRS port group 2. Optionally, the transport block may be alternatively divided into CBGs whose quantity is an integer multiple of the quantity of the DMRS port groups (for example, the transport block is divided into a CBG 1 to a CBG 4). Correspondingly, each DMRS port group is corresponding two CBGs (for example, the DMRS port group 1 is corresponding to the CBG 1 and the CBG 2, and the DMRS port group 2 is corresponding to the CBG 3 and the CBG 4). It can be learned that, it is ensured that data flows sent through different DMRS port groups belong to different CBGs, so that the terminal device can independently decode a CBG corresponding to each DMRS port group.

Correspondingly, the terminal device receives the data sent by the network device, and decodes the received data based on the learned DMRS port groups (for example, learns of the DMRS port groups based on the configuration information of the DMRS port groups in step S202). For example, the terminal device can learn of a division manner of the transport block (for example, a quantity of CBGs into which the transport block is divided) and a resource mapping manner of the transport block (for example, a transport layer to which the transport block is mapped) based on the DMRS port groups, so that the terminal device can independently decode a CBG corresponding to each DMRS port group.

(2) For uplink data transmission, after the terminal device learns of the configuration information of the DMRS port groups (in other words, learns of the DMRS port groups), the terminal device sends data to the network device, where the data is corresponding to a transport block (for example, a TB). The terminal device divides the transport block into at least one code block group CBG. Each of the at least one CBG is corresponding to one DMRS port group (that is, different DMRS port groups are corresponding to different CBGs, and one CBG is not corresponding to a plurality of DMRS port groups), and each of the at least one CBG is mapped to a transport layer corresponding to the one DMRS port group. It can be learned that, it is ensured that data flows sent through different DMRS port groups belong to different CBGs, so that the network device can independently decode a CBG corresponding to each DMRS port group.

Correspondingly, the network device receives the data sent by the terminal device, and decodes the received data based on the determined DMRS antenna port groups. For example, the network device can learn of a division manner of the transport block (for example, a quantity of CBGs into which the transport block is divided) and a resource mapping manner of the transport block (for example, a transport layer to which the transport block is mapped) based on the DMRS port groups, so that the network device can independently decode a CBG corresponding to each DMRS port group.

Optionally, for the foregoing downlink data transmission and/or uplink data transmission, implementations of dividing the transport block into the at least one CBG may include but are not limited to the following two implementations.

In a first implementation, the transport block with an added redundancy check bit is divided into N code blocks CBs, where $N=\lceil B/c \rceil$, B represents a total quantity of bits of the transport block with the added redundancy check bit, c represents a preset value (that is, a maximum quantity of bits included in a CB, for example, 6144 or 8196), and $\lceil \; \rceil$ represents a round-up operation. The N CBs are grouped into CBGs corresponding to the DMRS port groups (that is, each DMRS port group is corresponding to at least one CBG, different DMRS port groups are corresponding to different CBGs, and one CBG is not corresponding to a plurality of DMRS port groups). Optionally, a specific manner of concatenating the N CBs in the process of grouping the N CBs into the CBGs corresponding to the DMRS port groups is not limited in this embodiment of this application. Optionally, a quantity of CBs included in each CBG is equal to a value calculated based on the following formula: $\lfloor (B_0/B_s) \times N \rfloor$ or $\lceil (B_0/B_s) \times N \rceil$. Optionally, a total quantity of CBs included in all CBGs is equal to a total quantity N of CBs in a system. $B_0$ represents a quantity of bits of data sent through a DMRS port group corresponding to the CBG, $B_s$ represents a total quantity of bits of data sent through the DMRS port groups, $\lfloor \; \rfloor$ represents a round-down operation, and $\lceil \; \rceil$ represents a round-up operation. Optionally, a quantity of bits of data sent through each DMRS port is equal to a modulation and coding scheme (MCS) at a transport layer corresponding to the DMRS port×a quantity of transport layers corresponding to the DMRS port×a quantity of physical time-frequency resource elements (RE)

that are used for data communication and that are allocated to the transport layer corresponding to the DMRS port.

For example, assuming that a quantity of bits of data sent through the DMRS port group 1 is B1, a quantity of bits of data sent through the DMRS port group 2 is B2, and the transport block is divided into N code blocks CBs, a quantity of CBs included in the CBG 1 corresponding to the DMRS port group 1 is equal to $$\left\lceil \frac{B1}{B1+B2} \times N \right\rceil,$$

and correspondingly, a quantity of CBs included in the CBG 2 corresponding to the DMRS port group 2 is equal to a value of $$N - \left\lceil \frac{B1}{B1+B2} \times N \right\rceil.$$

Alternatively, a quantity of CBs included in the CBG 1 corresponding to the DMRS port group 1 is equal to $$\left\lfloor \frac{B1}{B1+B2} \times N \right\rfloor,$$

and correspondingly, a quantity of CBs included in the CBG 2 corresponding to the DMRS port group 2 is equal to a value of $$N - \left\lfloor \frac{B1}{B1+B2} \times N \right\rfloor.$$

Figure 2B:
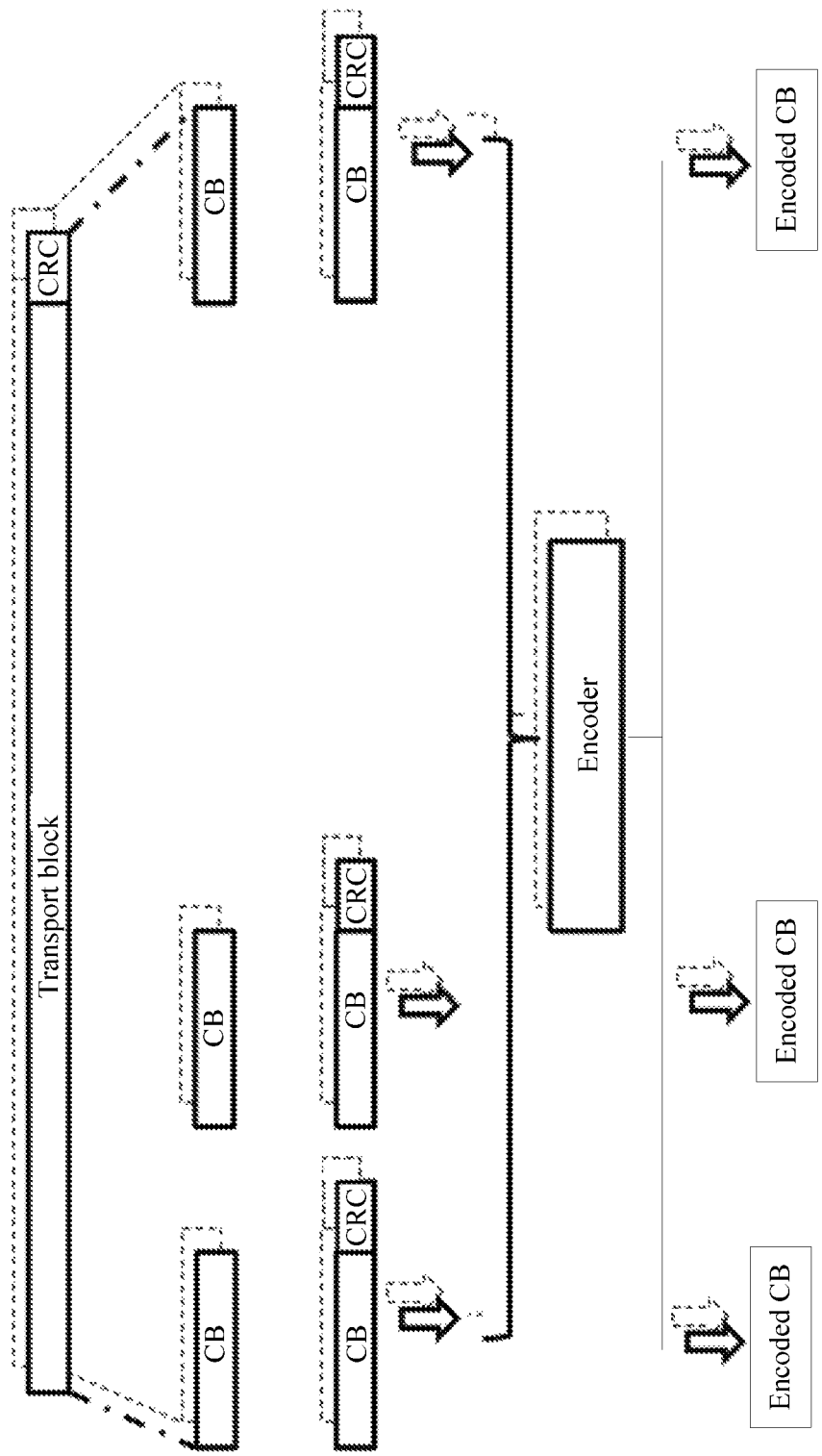
FIG. 2B is a schematic diagram of CB division according to an embodiment of this application.

Optionally, for a process of dividing the transport block into the N code blocks CBs, refer to processes of segmenting code blocks and redundancy check in the section 5.1.2 in the version 13.1.0 (v13.1.0) of 3GPP LTE TS 36.212. Details are not described herein. It can be understood that the process of dividing the transport block into the CBs may be alternatively performed in another existing manner or a future manner, and a parameter used in the division process may be different from that in the existing solution. This is not limited in this embodiment of the present invention. For example, FIG. 2B is a schematic diagram of CB division according to an embodiment of this application. As shown in FIG. 2B, a transport block (for example, a TB) may be considered as media access control (MAC) layer data, and the transport block with added cyclic redundancy check (CRC) is usually divided into N CBs. Then independent CRC is applied to each CB, and each CB is encoded to obtain N encoded CBs.

In a second implementation, the transport block is divided into a transport sub-block corresponding to each DMRS port group (that is, each DMRS port group is corresponding to one transport sub-block, different DMRS port groups are corresponding to different transport sub-blocks, and one transport sub-block is not corresponding to a plurality of DMRS port groups); and each transport sub-block is encoded to obtain a CBG corresponding to the DMRS port group. Optionally, for a process of coding each transport sub-block, refer to a general coding process in the section 5.1 in the version 13.1.0 (v13.1.0) of 3GPP LTE TS 36.212. Details are not described herein. It can be understood that the process of coding the transport sub-block may be alternatively performed in another existing manner or a future manner, and a parameter used in the coding process may be different from that in the existing solution. This is not limited in this embodiment of the present invention.

In this embodiment of this application, sequence numbers of the foregoing steps constitute no limitation on execution sequences, and the execution sequences of the steps should be determined based on functions and internal logic of the steps. This is not limited in this embodiment of this application.

In this embodiment of this application, the network device and the terminal device perform data communication, where the data is corresponding to the transport block, the transport block is divided into the at least one code block group CBG, and each of the at least one CBG is corresponding to one DMRS port group and is mapped to a transport layer corresponding to the one DMRS port group. It can be learned that, it is ensured that data flows sent through different DMRS port groups belong to different CBGs, so that a receive end can independently decode a CBG corresponding to each DMRS port group (in other words, can independently decode data flows mapped to different transport layers), and therefore can support interference cancellation performed by an interference cancellation receiver.

Further, because the receive end can independently decode the CBG corresponding to each DMRS port group, the receive end can perform ACK/NACK feedback in a form of a CBG. For example, when correctly decoding a CBG, the receive end feeds back an ACK; otherwise, the receive end feeds back a NACK. Correspondingly, a transmit end needs to retransmit the CBG incorrectly decoded by the receive end, until the receive end correctly receives the CBG or a maximum quantity of retransmission times is reached. Optionally, by default, a mapped-to transport layer during retransmission may be the same as a mapped-to transport layer during initial transmission; or certainly, an exchange identifier may be used to indicate that a mapped-to transport layer during retransmission is different from a mapped-to transport layer during initial transmission. For example, assuming that the CBG 1 and the CBG 2 are incorrectly decoded, and that during initial transmission, the CBG 1 is mapped to first two layers and the CBG 2 is mapped to last two layers, based on an exchange identifier, during retransmission, the CBG 1 is mapped to the last two layers and the CBG 2 is mapped to the first two layers. For another example, assuming that the CBG 1 is incorrectly decoded, by default, a transport layer to which the CBG 1 is mapped during retransmission is the same as a transport layer to which the CBG is mapped during initial transmission; or an exchange identifier may be used to indicate that a transport layer to which the CBG 1 is mapped during retransmission is the same as a transport layer to which the CBG 2 is mapped during initial transmission.

The foregoing embodiment of this application mainly describes the following: Transport block division is performed at different transport layers or different antenna ports during MIMO communication based on a quantity of DMRS port groups, so that each DMRS port group is corresponding to at least one CBG. Optionally, if division in time domain and/or frequency domain are/is further used, the at least one CBG corresponding to each DMRS port group may be corresponding to different symbol groups in time domain, and/or may be corresponding to different subband groups in frequency domain. For example, assuming that a DMRS port group is corresponding to a CBG 1 to a CBG 3, if division in time domain is further used, the CBG 1 and the CBG 2 are corresponding to a symbol group 1, and the CBG 3 is corresponding to a symbol group 2; or if division in frequency domain is further used, the CBG 1 is corresponding to a subband group 1, and the CBG 2 and the CBG 3 are corresponding to a subband group 2. Correspondingly, in addition to space domain (that is, a transport layer or an antenna port), a CBG may be further mapped in time domain and/or frequency domain. For example, layer mapping (the resource mapping manner described in Embodiment 1 of this application), frequency-domain mapping, and time-domain mapping are sequentially performed. For specific frequency-domain mapping and/or time-domain mapping, refer to existing mapping manners. For example, time-domain mapping is performed based on a symbol group (including at least one symbol), and/or frequency-domain mapping is performed based on a subband group (including at least one subband).

Figure 3:
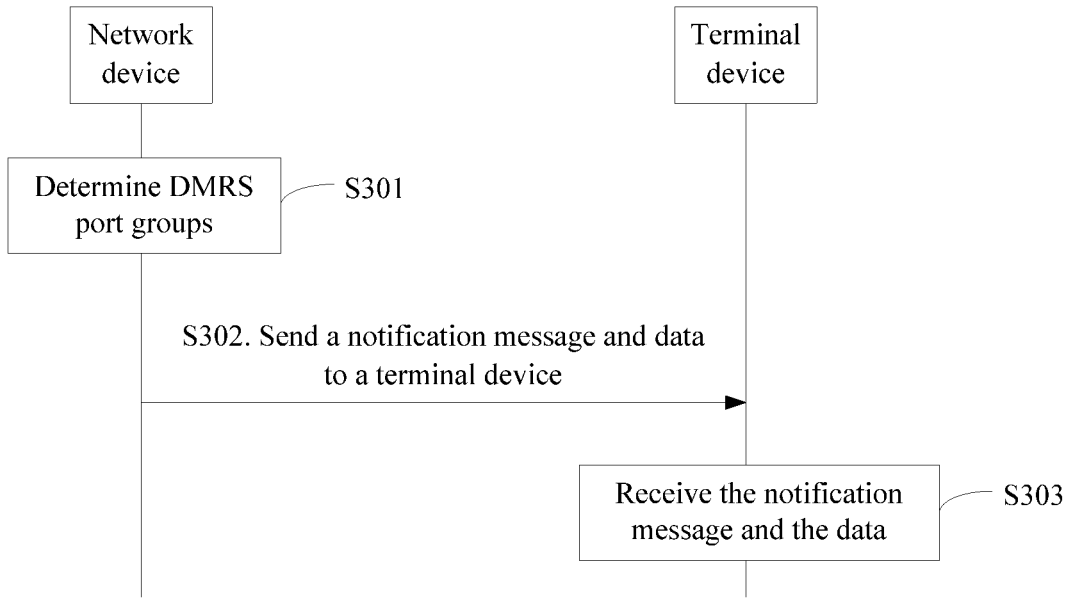
FIG. 3 is a schematic flowchart of Embodiment 2 of a data communication method according to this application.

FIG. 3 is a schematic flowchart of Embodiment 2 of a data communication method according to this application. Based on the foregoing embodiment, this embodiment of this application describes downlink non-coherent MIMO communication (that is, there is a plurality of DMRS antenna port groups). As shown in FIG. 3, the method in this embodiment may include the following steps.

Step S301: A network device determines demodulation reference signal DMRS port groups.

In this step, the network device determines the DMRS port groups used by the network device to send data to a terminal device. Optionally, a quantity of the DMRS port groups is greater than or equal to 2.

Step S302: The network device sends a notification message and data to a terminal device.

Optionally, the notification message carries configuration information of the DMRS port groups, so that the terminal device can learn of the DMRS port groups based on the notification message.

Optionally, the data is corresponding to a transport block. The network device divides the transport block into at least one code block group CBG. Each of the at least one CBG is corresponding to one DMRS port group, and each of the at least one CBG is mapped to a transport layer corresponding to the one DMRS port group. For a specific division manner, refer to Embodiment 1 of this application. For a resource mapping manner, refer to Embodiment 1 or Embodiment 7 of this application. Details are not described herein again.

Step S303: The terminal device receives the notification message and the data.

In this step, the terminal device determines the DMRS port groups based on the notification message, and can learn of the division manner of the transport block (for example, a quantity of CBGs into which the transport block is divided) and the resource mapping manner of the transport block (for example, a transport layer to which the transport block is mapped) based on the DMRS port groups, so that the terminal device can independently decode a CBG corresponding to each DMRS port group (in other words, can independently decode data flows mapped to different transport layers), and can support interference cancellation performed by an interference cancellation receiver.

Figure 4:
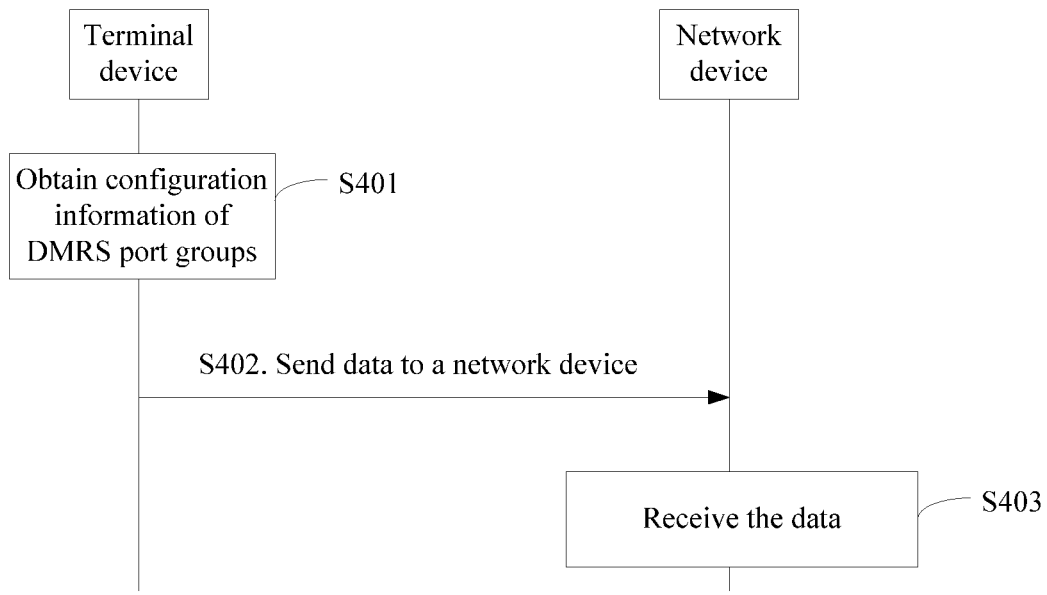
FIG. 4 is a schematic flowchart of Embodiment 3 of a data communication method according to this application.

FIG. 4 is a schematic flowchart of Embodiment 3 of a data communication method according to this application. Based on the foregoing embodiment, this embodiment of this application describes uplink non-coherent MIMO communication (that is, there is a plurality of DMRS antenna port groups). As shown in FIG. 4, the method in this embodiment may include the following steps.

Step S401: A terminal device obtains configuration information of demodulation reference signal DMRS port groups.

In this step, the terminal device learns, based on the configuration information of the DMRS port groups, of the DMRS port groups used by the terminal device to send data to a network device. Optionally, a quantity of the DMRS port groups is greater than or equal to 2. Optionally, the configuration information of the DMRS port groups may be notified by the network device to the terminal device, or may be predefined in the terminal device (correspondingly, configuration information of the DMRS port groups is also predefined in the network device).

Step S402: The terminal device sends data to a network device.

Optionally, the data is corresponding to a transport block. The terminal device divides the transport block into at least one code block group CBG. Each of the at least one CBG is corresponding to one DMRS port group, and each of the at least one CBG is mapped to a transport layer corresponding to the one DMRS port group. For a specific division manner, refer to Embodiment 1 of this application. For a resource mapping manner, refer to Embodiment 1 or Embodiment 7 of this application. Details are not described herein again.

Step S403: The network device receives the data.

In this step, the network device can learn of the division manner of the transport block (for example, a quantity of CBGs into which the transport block is divided) and the resource mapping manner of the transport block (for example, a transport layer to which the transport block is mapped) based on the DMRS port groups used by the terminal device to send the data to the network device, so that the network device can independently decode a CBG corresponding to each DMRS port group.

Figure 5:
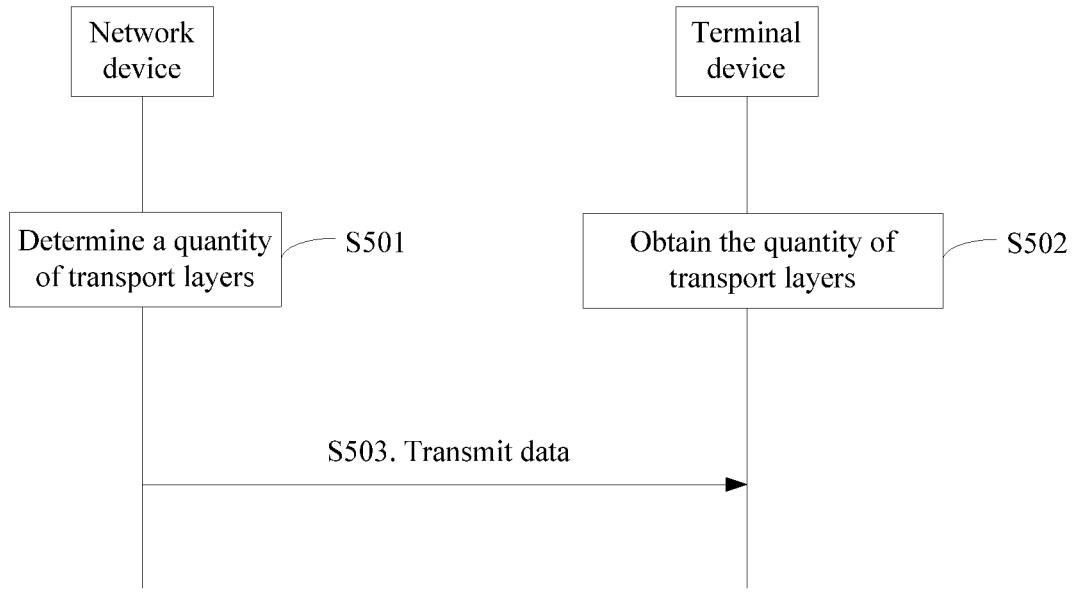
FIG. 5 is a schematic flowchart of Embodiment 4 of a data communication method according to this application.

FIG. 5 is a schematic flowchart of Embodiment 4 of a data communication method according to this application. This embodiment of this application describes coherent MIMO communication (that is, there is one DMRS antenna port group). As shown in FIG. 5, the method in this embodiment may include the following steps.

Step S501: A network device determines a quantity of transport layers.

In this step, the network device determines a quantity of transport layers corresponding to each transport block (for example, TB). Optionally, the network device determines, based on scheduling result information (for example, a downlink reference signal for measurement or an uplink sounding reference signal) sent by a terminal device, a total quantity of transport layers used for data communication between the network device and the terminal device. Usually, when the total quantity of transport layers is greater than or equal to 1 and less than or equal to 4, transmission for one transport block is supported; or when the total quantity of transport layers is greater than 4 and less than or equal to 8, transmission for two transport blocks is supported. It can be learned that when the total quantity of transport layers is determined, the network device can learn of the quantity of transport layers corresponding to each transport block. Certainly, the network device may alternatively determine the quantity of transport layers in another manner. This is not limited in this embodiment of this application.

Step S502: A terminal device obtains the quantity of transport layers.

In this step, manners of obtaining the quantity of transport layers by the terminal device may include but are not limited to the following manners: receiving, by the terminal device, a notification message (optionally, the notification message carries configuration information of the quantity of transport layers) sent by the network device; or obtaining, by the terminal device, predefined configuration information of the quantity of transport layers. Optionally, the notification message may include but is not limited to any one of the following: downlink control information (DCI), a radio resource control (RRC) message, and a MAC CE.

Optionally, the notification message may further carry information about an antenna port included in the DMRS port group, so that the terminal device can learn of an antenna port used for data communication. Optionally, the terminal device may alternatively obtain predefined information about an antenna port included in the DMRS port group. Certainly, the terminal device may alternatively obtain the information about the antenna port in another manner. This is not limited in this embodiment of this application.

Step S503: The network device and the terminal device perform data communication.

In this step, (1) for downlink data transmission, the network device sends data to the terminal device, where the data is corresponding to a transport block (for example, a TB), and the transport block is mapped to a corresponding transport layer based on the quantity of transport layers.

Optionally, implementations of mapping the transport block to the corresponding transport layer based on the quantity of transport layers include but are not limited to the following two implementations.

In a first implementation, if the quantity of transport layers is greater than or equal to 1 and less than or equal to 4, the transport block is mapped to the corresponding transport layer. For example, when the quantity of transport layers is equal to 1, the transport block is mapped to corresponding one transport layer; when the quantity of transport layers is equal to 2, the transport block is mapped to corresponding two transport layers; when the quantity of transport layers is equal to 3, the transport block is sequentially mapped to corresponding three transport layers; or when the quantity of transport layers is equal to 4, the transport block is sequentially mapped to corresponding four transport layers. Optionally, the network device indicates, by using dynamic signaling or a predefined rule, a relationship between a transport layer and an antenna port used to send a data flow at the transport layer, so that after learning of an antenna port used for sending, the terminal device maps the transport block to a transport layer corresponding to the antenna port, and sends a data flow at the transport layer through the antenna port.

In a second implementation: (A) if the quantity of transport layers is equal to 1 or 2, the transport block is mapped to the corresponding transport layer. For example, when the quantity of transport layers is equal to 1, the transport block is mapped to corresponding one transport layer; or when the quantity of transport layers is equal to 2, the transport block is mapped to corresponding two transport layers. (B) If the quantity of transport layers is equal to 3 or 4, the transport block is divided into two code block groups CBGs, and the two CBGs are mapped to different transport layers; or the transport block is mapped to corresponding transport layers (for example, three transport layers or four transport layers). Optionally, the transport block is mapped to corresponding transport layers according to a predefined rule or a rule that is indicated by a dynamic configuration message. For example, when the quantity of transport layers is equal to 3, the transport block is divided into a CBG 1 and a CBG 2, the CBG 1 is mapped to any one of the three layers, and the CBG 2 is mapped to the other two transport layers, of the three layers, different from the transport layer to which the CBG 1 is mapped; or the CBG 1 is mapped to any two of the three layers, and the CBG 2 is mapped to the other transport layer, of the three layers, different from the transport layers to which the CBG 1 is mapped. For another example, when the quantity of transport layers is equal to 4, the transport block is divided into a CBG 1 and a CBG 2, the CBG 1 is mapped to any two transport layers (for example, first two layers) of the four layers, and the CBG 2 is mapped to the other two transport layers (for example, last two transport layers), of the four layers, different from the transport layers to which the CBG 1 is mapped.

Optionally, according to the second implementation, the method further includes: determining, by the network device based on that a difference between channel quantity information corresponding to different DMRS ports is greater than a preset threshold, to divide the transport block when the quantity of transport layers is equal to 3 or 4. In other words, when the difference between channel quantity information corresponding to different DMRS ports is less than or equal to the preset threshold, the network device determines not to divide the transport block when the quantity of transport layers is equal to 3 or 4. Optionally, the network device may alternatively determine, according to a service requirement, whether to divide the transport block when the quantity of transport layers is equal to 3 or 4. Optionally, for a delay-sensitive service, the network device may determine that the transport block does not need to be divided when the quantity of transport layers is equal to 3 or 4. For a non-delay-sensitive service, the network device may determine to divide the transport block when the quantity of transport layers is equal to 3 or 4. The delay-sensitive service is a service that requires that ACK/NACK feedback be performed within one subframe, for example, an ultra low latency and reliability connection (ULLRC) service; on the contrary, a service that does not require that ACK/NACK feedback be performed within one subframe is a non-delay-sensitive service, for example, a mobile broadband (MBB) service.

To ensure that the terminal device side can learn of division and mapping manners used on the network device side, the method further includes: sending, by the network device, a group configuration message to the terminal device, where the group configuration message is used to instruct to divide the transport block when the quantity of transport layers is equal to 3 or 4. Optionally, the group configuration message may be carried in any one of the following information: DCI, an RRC message, and a MAC CE. Certainly, the group configuration message may be alternatively carried in other information. This is not limited in this embodiment of this application.

Correspondingly, the terminal device receives the data sent by the network device. When the terminal device does not receive the group configuration message, the terminal device directly decodes the received data based on the learned quantity of transport layers (for example, based on the quantity of transport layers that is obtained in step S502). For example, the terminal device can learn of a resource mapping manner of the data (for example, a transport layer to which the data is mapped) based on the quantity of transport layers. When receiving the group configuration message, the terminal device can learn, based on the quantity of transport layers, of a resource mapping manner used when the quantity of transport layers is equal to 1 or 2, and can determine, based on the group configuration message, resource division (for example, a quantity of CBGs into which the data is divided) and mapping (for example, a transport layer to which the data is mapped) manners used when the quantity of transport layers is equal to 3 or 4.

(2) For uplink data transmission, the terminal device sends data to the network device, where the data is corresponding to a transport block (for example, a TB), and the transport block is mapped to a corresponding transport layer based on the quantity of transport layers.

Optionally, implementations of mapping the transport block to the corresponding transport layer based on the quantity of transport layers include but are not limited to the following two implementations.

In a first implementation, if the quantity of transport layers is greater than or equal to 1 and less than or equal to 4, the transport block is mapped to the corresponding transport layer. For example, when the quantity of transport layers is equal to 1, the transport block is mapped to corresponding one transport layer; when the quantity of transport layers is equal to 2, the transport block is mapped to corresponding two transport layers; when the quantity of transport layers is equal to 3, the transport block is sequentially mapped to corresponding three transport layers; or when the quantity of transport layers is equal to 4, the transport block is sequentially mapped to corresponding four transport layers.

In a second implementation: (A) if the quantity of transport layers is equal to 1 or 2, the transport block is mapped to the corresponding transport layer. (B) If the quantity of transport layers is equal to 3 or 4, and a group configuration message is used to instruct to divide the transport block, the transport block is divided into two code block groups CBGs, and the two CBGs are mapped to different transport layers; or if the group configuration message is not obtained, the transport block is mapped to corresponding transport layers. For example, if the terminal device obtains the group configuration message, the transport block is divided into two CBGs; or if the terminal device does not obtain the group configuration message, the transport block is directly mapped to corresponding transport layers. Optionally, the terminal device may obtain the group configuration message by receiving the group configuration message sent by the network device, or may obtain the group configuration message by obtaining a preconfigured group configuration message, or certainly, may obtain the group configuration message in another manner. This is not limited in this embodiment of this application.

Correspondingly, the network device receives the data sent by the terminal device. When the group configuration message is not obtained, the network device directly decodes the received data based on the quantity of transport layers (for example, based on the quantity of transport layers that is determined in step S501). For example, the network device can learn of a resource mapping manner of the data (for example, a transport layer to which the data is mapped) based on the quantity of transport layers. When the group configuration message is obtained, the network device can learn, based on the quantity of transport layers, of a resource mapping manner used when the quantity of transport layers is equal to 1 or 2, and can determine, based on the group configuration message, resource division (for example, a quantity of CBGs into which the data is divided) and mapping (for example, a transport layer to which the data is mapped) manners used when the quantity of transport layers is equal to 3 or 4.

In this embodiment of this application, sequence numbers of the foregoing steps constitute no limitation on execution sequences, and the execution sequences of the steps should be determined based on functions and internal logic of the steps. This is not limited in this embodiment of this application.

In this embodiment of this application, the network device and the terminal device perform data communication, where the data is corresponding to the transport block, and the transport block is mapped to the corresponding transport layer based on the quantity of transport layers. It can be learned that flexible resource mapping can be implemented based on different quantities of transport layers, to adapt to different service requirements, different transmission scenarios, different channel statuses, or the like.

The foregoing embodiment of this application describes a mapping manner during initial transmission, and the following part describes a mapping manner during retransmission. Optionally, when a quantity of transport layers corresponding to a single transport block is equal to 1 or 2, by default, a mapped-to transport layer during retransmission is the same as a mapped-to transport layer during initial transmission. When a quantity of transport layers corresponding to a single transport block is equal to 3 or 4, by default, a mapped-to transport layer during retransmission may be the same as a mapped-to transport layer during initial transmission; or certainly, an exchange identifier may be used to indicate that a mapped-to transport layer during retransmission is different from a mapped-to transport layer during initial transmission. For example, assuming that the CBG 1 and the CBG 2 are incorrectly decoded, and that during initial transmission, the CBG 1 is mapped to first two layers and the CBG 2 is mapped to last two layers, based on an exchange identifier, during retransmission, the CBG 1 is mapped to the last two layers and the CBG 2 is mapped to the first two layers. For another example, assuming that the CBG 1 is incorrectly decoded, by default, a transport layer to which the CBG 1 is mapped during retransmission is the same as a transport layer to which the CBG is mapped during initial transmission; or an exchange identifier may be used to indicate that a transport layer to which the CBG 1 is mapped during retransmission is the same as a transport layer to which the CBG 2 is mapped during initial transmission.

Optionally, in this embodiment of this application, for a manner of dividing the transport block into one or more CBGs, refer to related content about that "the transport block is divided into at least one CBG" in Embodiment 1 of this application. Details are not described herein again.

Optionally, in this embodiment of this application, the CBG is obtained through transport block division merely at different transport layers during MIMO communication, namely, division in space domain. If division in time domain and/or frequency domain are/is further used, this embodiment of this application is also applicable to a CBG obtained through transport block division in space domain in combination with symbol division in time domain and/or subband division in frequency domain, and certainly, is also applicable to other cases. This is not limited in this embodiment of this application. Specifically, how to divide a transport block in time domain and/or frequency domain and how to perform resource mapping in time domain and/or frequency domain are not limited in this embodiment of this application.

The foregoing embodiment of this application mainly describes mapping of a transport block in space domain. The transport block may be further mapped in time domain and/or frequency domain. For example, layer mapping (the resource mapping manner described in Embodiment 4 of this application), frequency-domain mapping, and time-domain mapping are sequentially performed. For specific frequency-domain mapping and/or time-domain mapping, refer to existing mapping manners. For example, time-domain mapping is performed based on a symbol group (including at least one symbol), and/or frequency-domain mapping is performed based on a subband group (including at least one subband).

Figure 6:
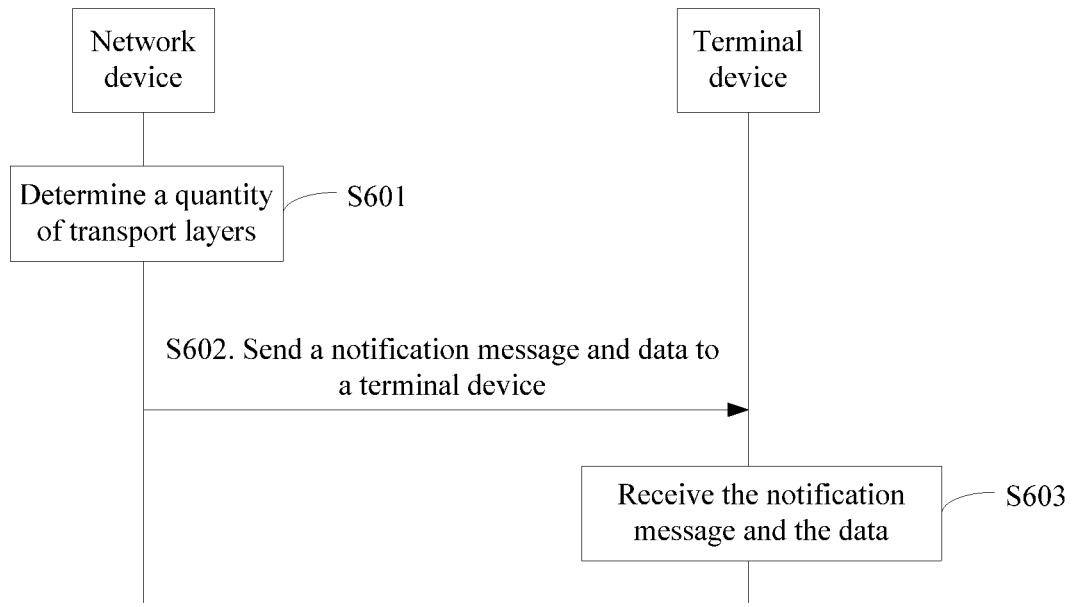
FIG. 6 is a schematic flowchart of Embodiment 5 of a data communication method according to this application.

FIG. 6 is a schematic flowchart of Embodiment 5 of a data communication method according to this application. Based on Embodiment 4, this embodiment of this application describes downlink coherent MIMO communication (that is, there is one DMRS antenna port group). As shown in FIG. 6, the method in this embodiment may include the following steps.

Step S601: A network device determines a quantity of transport layers.

In this step, the network device determines a quantity of transport layers corresponding to each transport block (for example, TB).

Step S602: The network device sends a notification message and data to a terminal device.

Optionally, the notification message carries configuration information of the quantity of transport layers, so that the terminal device can learn of the quantity of transport layers based on the notification message. Optionally, the notification message may further carry information about an antenna port included in the DMRS port group, so that the terminal device can learn of an antenna port used for data communication.

Optionally, the data is corresponding to a transport block, and the transport block is mapped to a corresponding transport layer based on the quantity of transport layers. For a specific resource mapping manner, refer to Embodiment 4 of this application. Details are not described herein again.

Step S603: The terminal device receives the notification message and the data.

In this step, the terminal device determines, based on the notification message, the quantity of transport layers and the antenna port included in the DMRS port group. When the terminal device does not receive a group configuration message sent by the network device, the terminal device can directly learn of the resource mapping manner of the transport block (for example, a transport layer to which the transport block is mapped) based on the quantity of transport layers. When receiving a group configuration message sent by the network device, the terminal device can learn, based on the quantity of transport layers, of a resource mapping manner used when the quantity of transport layers is equal to 1 or 2, and can learn, based on the group configuration message, of resource division and mapping manners used when the quantity of transport layers is equal to 3 or 4. It can be learned that flexible resource mapping can be implemented based on different quantities of transport layers, to adapt to different service requirements, different transmission scenarios, different channel statuses, or the like.

Figure 7:
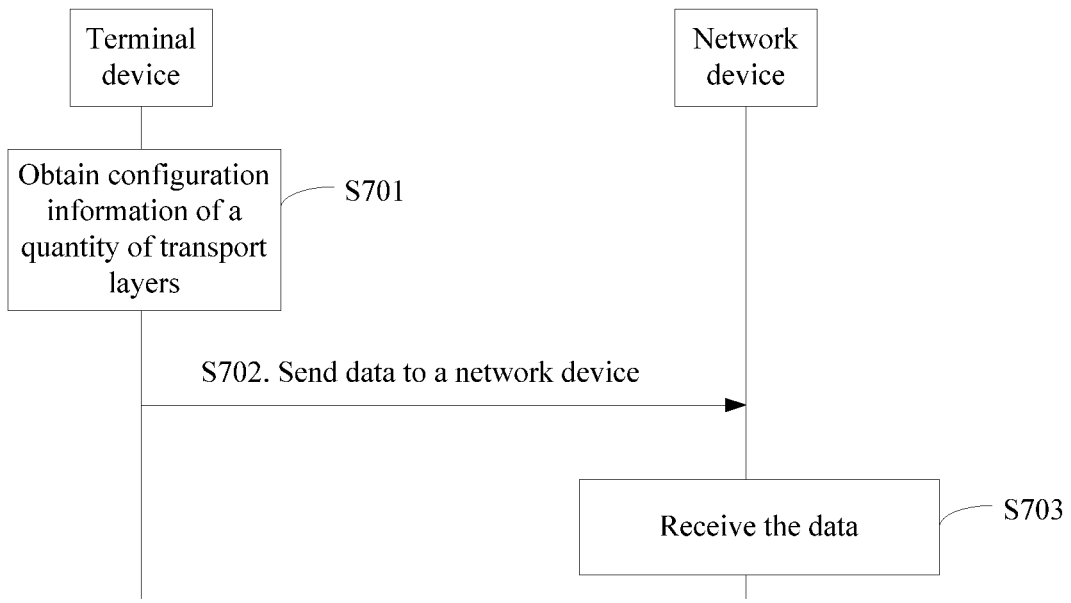
FIG. 7 is a schematic flowchart of Embodiment 6 of a data communication method according to this application.

FIG. 7 is a schematic flowchart of Embodiment 6 of a data communication method according to this application. Based on Embodiment 4, this embodiment of this application describes uplink coherent MIMO communication (that is, there is one DMRS antenna port group). As shown in FIG. 7, the method in this embodiment may include the following steps.

Step S701: A terminal device obtains configuration information of a quantity of transport layers.

In this step, the terminal device learns, based on the configuration information of the quantity of transport layers, of a quantity of transport layers corresponding to each transport block (for example, a TB). Optionally, the configuration information of the quantity of transport layers may be notified by a network device to the terminal device, or may be predefined in the terminal device (correspondingly, configuration information of the quantity of transport layers is also predefined in the network device). Optionally, the terminal device may further obtain information about an antenna port included in the DMRS port group, and therefore can learn of an antenna port used to send data to the network device. For a manner of obtaining the information about the antenna port, refer to related descriptions in Embodiment 5 of this application. Details are not described herein again.

Step S702: The terminal device sends data to the network device.

Optionally, the data is corresponding to a transport block, and the transport block is mapped to a corresponding transport layer based on the quantity of transport layers. For a specific resource mapping manner, refer to Embodiment 4 of this application. Details are not described herein again.

Step S703: The network device receives the data.

In this step, the network device receives the data sent by the terminal device. When no group configuration message is obtained, the network device can directly learn of the resource mapping manner of the data (for example, a transport layer to which the data is mapped) based on the quantity of transport layers. When a group configuration message is obtained, the network device can learn, based on the quantity of transport layers, of a resource mapping manner used when the quantity of transport layers is equal to 1 or 2, and can learn, based on the group configuration message, resource division (for example, a quantity of CBGs into which the data is divided) and mapping (a transport layer to which the data is mapped) manners used when the quantity of transport layers is equal to 3 or 4. It can be learned that flexible resource mapping can be implemented based on different quantities of transport layers, to adapt to different service requirements, different transmission scenarios, different channel statuses, or the like.

In Embodiment 7 of the data communication method in this application, implementations of that "each of the at least one CBG is mapped to a transport layer corresponding to the one DMRS port group" in Embodiment 1 to Embodiment 3 are described.

Optionally, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

Optionally, that a preset quantity of data bits are sequentially extracted in a first preset order from a data bit sequence included in a CBG corresponding to each DMRS port group, and serial concatenation is performed on the data bits to obtain a concatenated data bit sequence may be implemented in at least one of the following several implementations.

In a first implementation, for example, assuming that there are a total of three DMRS port groups (a DMRS port group 1 to a DMRS port group 3, where a quantity of DMRS port groups is certainly not limited thereto), a preset quantity of data bits are sequentially extracted in a preset order from a data bit sequence included in a CBG corresponding to each DMRS port group. Optionally, quantities of data bits extracted from data bit sequences included in CBGs corresponding to different DMRS port groups may be the same or different, in other words, preset quantities corresponding to different DMRS port groups may be the same or different. It is assumed that extraction of the data bit sequence included in the CBG corresponding to each DMRS port group is completed at a time, that is, the preset order in the first implementation is the first preset order. Further, serial concatenation is sequentially performed on the extracted data bits to obtain the concatenated data bit sequence. Optionally, the preset order may be an ascending order of sequence numbers of DMRS port groups, or a descending order of sequence numbers of DMRS port groups, or another preset order, or a network-configured order. The network-configured order may be explicitly indicated by using higher layer signaling or physical layer signaling.

In a second implementation, for example, it is assumed that there are a total of three DMRS port groups (a DMRS port group 1 to a DMRS port group 3, where a quantity of DMRS port groups is certainly not limited thereto). (1) First, front data bits of a preset quantity are sequentially extracted in a preset order (referred to as a second preset order in the following embodiments, for example, an ascending order of sequence numbers of DMRS port groups, or a descending order of sequence numbers of DMRS port groups, or another preset order, or a network-configured order) from a data bit sequence included in a CBG corresponding to each DMRS port group. Optionally, quantities of bits extracted from data bit sequences included in CBGs corresponding to different DMRS port groups may be the same or different, in other words, preset quantities corresponding to different DMRS port groups may be the same or different. For details, refer to Qi in the following part. It is assumed that extraction on the data bit sequence included in the CBG corresponding to each DMRS port group is not completed at a time. (2) Next, front data bits of a preset quantity are sequentially extracted in the second preset order from a remaining data bit sequence included in the CBG corresponding to each DMRS port group (the remaining data bit sequence included in the CBG corresponding to each DMRS port group includes a data bit that remains after the front data bits of the preset quantity are extracted the first time from the data bit sequence included in the CBG corresponding to the DMRS port group), and so on, until the entire data bit sequence included in the CBG corresponding to each DMRS port group is extracted, that is, an order in which data bits are extracted a plurality of times in the second preset order in the second implementation is the first preset order, and then serial concatenation is sequentially performed on the extracted data bits in a sequential order to obtain the concatenated data bit sequence. Certainly, that a preset quantity of data bits are sequentially extracted in a first preset order from a data bit sequence included in a CBG corresponding to each DMRS port group, and serial concatenation is performed on the data bits to obtain a concatenated data bit sequence may be alternatively implemented in another implementation. This is not limited in this embodiment of this application.

Optionally, this embodiment of this application describes in detail the second implementation of that "a preset quantity of data bits are sequentially extracted in a first preset order from a data bit sequence included in a CBG corresponding to each DMRS port group, and serial concatenation is performed on the data bits to obtain a concatenated data bit sequence". Optionally, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, $1 \le i \le R$, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where $2 \le k \le m$, and the remaining data bit sequence included in the CBG corresponding to the DMRS port group includes a data bit that remains after data bit extraction is performed k−1 times on the data bit sequence included in the CBG corresponding to the DMRS port group.

In this embodiment of this application, (i) the first Qi data bits are sequentially extracted in the second preset order (for example, the ascending order of sequence numbers of DMRS port groups, or the descending order of sequence numbers of DMRS port groups, or the another preset order, or the network-configured order) from the data bit sequence included in the CBG corresponding to each DMRS port group, and serial concatenation is performed on the data bits to obtain the first data bit sequence. For example, assuming that the second preset order is the ascending order of sequence numbers of DMRS port groups, Qi represents a quantity of data bits extracted from a data bit sequence included in a CBG corresponding to a DMRS port group 1, Q2 represents a quantity of data bits extracted from a data bit sequence included in a CBG corresponding to a DMRS port group 2, and so on, where $$Q1 = \sum_{l=0}^{L_1} q_l,$$

$L_1$ is a quantity of transport layers corresponding to the DMRS port group 1, and $q_l$ is a modulation order corresponding to an $l^{th}$ transport layer in transport layers corresponding to the DMRS port group 1. Optionally, when a modulation scheme corresponding to a transport layer is quadrature phase shift keying (Quadrature Phase Shift Keying, QPSK) modulation, a modulation order corresponding to the transport layer is 2; when a modulation scheme corresponding to a transport layer is 16 quadrature amplitude modulation (Quadrature Amplitude Modulation, QAM), a modulation order corresponding to the transport layer is 4; when a modulation scheme corresponding to a transport layer is 64 QAM, a modulation order corresponding to the transport layer is 6; or when a modulation scheme corresponding to a transport layer is 256 QAM, a modulation order corresponding to the transport layer is 8. Optionally, for one codeword, all transport layers are corresponding to a same modulation scheme.

2) If after extraction is performed once on the data bit sequence included in the CBG corresponding to each DMRS port group, the entire data bit sequence is still not extracted, first Qi data bits are sequentially extracted in the second preset order from a remaining data bit sequence included in the CBG corresponding to each DMRS port group, and serial concatenation is performed on the data bits to obtain a second data bit sequence. The remaining data bit sequence included in the CBG corresponding to each DMRS port group includes a data bit that remains after data bit extraction is performed once on the data bit sequence included in the CBG corresponding to the DMRS port group.

(3) If after extraction is performed twice on the data bit sequence included in the CBG corresponding to each DMRS port group, the entire data bit sequence is still not extracted, first Qi data bits are sequentially extracted in the second preset order from a remaining data bit sequence included in the CBG corresponding to each DMRS port group, and serial concatenation is performed on the data bits to obtain a third data bit sequence, where the remaining data bit sequence included in the CBG corresponding to each DMRS port group includes a data bit that remains after extraction is performed twice on the data bit sequence included in the CBG corresponding to the DMRS port group; and so on, until the whole data bit sequence included in the CBG corresponding to each DMRS port group is extracted after first Qi data bits are sequentially extracted in the second preset order from a remaining data bit sequence (including a data bit that remains after data bit extraction is performed m−1 times on the data bit sequence included in the CBG corresponding to the DMRS port group) included in the CBG corresponding to each DMRS port group and serial concatenation is performed on the data bits. Then serial concatenation is sequentially performed on the first data bit sequence to the m$^{th}$ data bit sequence to obtain the concatenated data bit sequence.

Optionally, an s$^{th}$ data bit in the concatenated data bit sequence obtained by sequentially extracting the preset quantity of data bits in the first preset order from the data bit sequence included in the CBG corresponding to each DMRS port group and performing serial concatenation on the data bits is corresponding to an $(f_s \times Qs + a_s)^{th}$ data bit of a $q_s^{th}$ CBG, to ensure that the data bits included in the CBG corresponding to each DMRS port group can be mapped to a transport layer corresponding to the DMRS port group in a sequential order, and further enable an interference cancellation receiver to cancel interference between different transport layers. 1≤s≤a total quantity of data bits included in the CBG corresponding to each DMRS port groups. Qs represents a quantity of data bits extracted from a data bit sequence included in a CBG corresponding to an s$^{th}$ DMRS port group.

$$f_s = \left\lfloor \frac{S}{\sum_{i=1}^{R} Qi} \right\rfloor,$$

where ⌊ ⌋ represents a round-down operation.

$$a_s = r_s - \sum_{t=0}^{q_s-1} Qt,$$

where Qt represents a quantity of data bits extracted from a data bit sequence included in a CBG corresponding to a t$^{th}$ DMRS port group, $$r_s = s - \left\lfloor \frac{S}{\sum_{i=1}^{R} Qi} \right\rfloor \times \sum_{i=1}^{R} Qi, \sum_{t=0}^{q_s-1} Qt \le r_s \le \sum_{t=0}^{q_s} Qt, \text{ and } Q0 = 0.$$

Further, in this embodiment of this application, optionally, when that a preset quantity of data bits are sequentially extracted in a first preset order from a data bit sequence included in a CBG corresponding to each DMRS port group, and serial concatenation is performed on the data bits to obtain a concatenated data bit sequence is implemented in the first implementation, the concatenated data bit sequence is mapped to each transport layer according to a predefined mapping policy (for example, interleaved mapping), to ensure that the CBG corresponding to each DMRS port group is mapped to a transport layer corresponding to the DMRS port group. For example, all data bits included in a CBG corresponding to a DMRS port group 1 are mapped to a transport layer (optionally, there may be one or more layers) corresponding to the DMRS port group 1, and all data bits included in a CBG corresponding to a DMRS port group 2 are mapped to a transport layer corresponding to the DMRS port group 2. Optionally, when that a preset quantity of data bits are sequentially extracted in a first preset order from a data bit sequence included in a CBG corresponding to each DMRS port group, and serial concatenation is performed on the data bits to obtain a concatenated data bit sequence is implemented in the second implementation, the concatenated data bit sequence is mapped to each transport layer according to a predefined mapping policy (for example, sequential mapping), to ensure that the CBG corresponding to each DMRS port group is mapped to a transport layer corresponding to the DMRS port group. Certainly, when that a preset quantity of data bits are sequentially extracted in a first preset order from a data bit sequence included in a CBG corresponding to each DMRS port group, and serial concatenation is performed on the data bits to obtain a concatenated data bit sequence is implemented in another implementation, the concatenated data bit sequence is mapped to each transport layer according to a corresponding predefined mapping policy, to ensure that the CBG corresponding to each DMRS port group is mapped to a transport layer corresponding to the DMRS port group. This is not limited in this embodiment of this application.

Optionally, that the concatenated data bit sequence is mapped to each transport layer according to a predefined mapping policy may include the following processing process. For example, at least one of processes such as time-domain interleaving, frequency-domain interleaving, time-frequency interleaving, scrambling, modulation, and layer mapping is performed on the concatenated data bit sequence. Certainly, another processing process may be further included. This is not limited in this embodiment of this application.

Certainly, that each of the at least one CBG is mapped to a transport layer corresponding to the one DMRS port group may be alternatively implemented in another implementation. This is not limited in this embodiment of this application.

Optionally, in this embodiment of this application, considering that a mapping relationship between a DMRS port group and a corresponding transport layer is predefined in the network device and/or the terminal device, or the network device and/or the terminal device dynamically learns of a mapping relationship between a DMRS port group and a corresponding transport layer by using a higher layer message or a physical layer message, $L_i$ (that is, a quantity of transport layers corresponding to each DMRS port group) in the foregoing embodiment may be determined based on a mapping relationship between each DMRS port group and a corresponding transport layer. Optionally, $L_i$ in the foregoing embodiment may be alternatively indicated by using DCI. Certainly, the quantity of transport layers corresponding to each DMRS port group may be alternatively indicated in another manner. This is not limited in this embodiment of this application.

Optionally, for that the quantity of transport layers corresponding to each DMRS port group is indicated by using DCI, there may be at least the following several indication manners: (1) A total quantity of transport layers, and a quantity of transport layers corresponding to each remaining DMRS port group other than any one of all DMRS port groups are indicated by using DCI. For example, assuming that there are a total of two DMRS port groups, a total quantity of the transport layers, and a quantity of transport layers corresponding to any one of the two DMRS port groups are indicated by using DCI. (2) A quantity of transport layers corresponding to each DMRS port group is indicated by using DCI. (3) A quantity of transport layers corresponding to each DMRS port group is indicated by performing joint coding on a bit in an antenna port indication field in DCI. For example, indication is performed in a manner of reusing a bit in the antenna port indication field in the DCI or adding a bit to the antenna port indication field in the DCI.

In this embodiment of this application, to ensure that extraction of the data bit sequences included in the CBGs corresponding to all the DMRS port groups is simultaneously completed, it is pre-stipulated that lengths of the data bit sequences included in the CBGs corresponding to all the DMRS port groups are the same. Alternatively, optionally, CBGs corresponding to some DMRS port groups are filled with placeholders. A CBG that is corresponding to a DMRS port group (referred to as a $j^{th}$ DMRS port group in the following embodiment, where $1 \leq j \leq R$) and that needs to be filled with a placeholder satisfies the following feature: A quantity Co of times required for extracting an entire data bit sequence included in the CBG corresponding to the $j^{th}$ DMRS port group is less than a quantity Cmax of times required for extracting an entire data bit sequence included in a CBG corresponding to a $p^{th}$ DMRS port group. The quantity Cmax of times required for extracting the entire data bit sequence included in the CBG corresponding to the $p^{th}$ DMRS port group is a maximum quantity of times in quantities of times required for extracting all entire data bit sequences included in the CBGs corresponding to all the DMRS port groups, where $1 \leq p \leq R$. Optionally, a quantity of placeholders that need to be filled in the CBG corresponding to the $j^{th}$ DMRS port group is Qj×(Cmax−Co).

Optionally, when data communication in this embodiment of this application is uplink data transmission, operations, such as "extraction" and "mapping", included in this embodiment of this application are performed by the terminal device. When data communication in this embodiment of this application is downlink data transmission, operations, such as "extraction" and "mapping", included in this embodiment of this application are performed by the network device.

In this embodiment of this application, the network device and the terminal device perform data communication, where the data is corresponding to the transport block, the transport block is divided into the at least one code block group CBG, and each of the at least one CBG is corresponding to one DMRS port group. The preset quantity of data bits are sequentially extracted in the first preset order from the data bit sequence included in the CBG corresponding to each DMRS port group, and serial concatenation is performed on the data bits to obtain the concatenated data bit sequence. In addition, the concatenated data bit sequence is mapped to each transport layer according to the predefined mapping policy, to ensure that the CBG corresponding to each DMRS port group is mapped to a transport layer corresponding to the DMRS port group. It can be learned that, it is ensured that data flows sent through different DMRS port groups belong to different CBGs, so that a receive end can independently decode a CBG corresponding to each DMRS port group (in other words, can independently decode data flows mapped to different transport layers), and therefore can support interference cancellation performed by an interference cancellation receiver.

Optionally, the foregoing embodiment of this application mainly describes a process of mapping, to a corresponding transport layer, a CBG obtained through division in space domain (for example, a transport layer or an antenna port), and imposes no limitation or requirement on mapping of a CBG obtained through division in time domain or frequency domain. If division in time domain and/or frequency domain are/is further used, this embodiment of this application is also applicable to a CBG obtained through transport block division in space domain in combination with symbol division in time domain and/or subband division in frequency domain, and certainly, is also applicable to other cases. This is not limited in this embodiment of this application. For example, for mapping, to a corresponding physical resource, a CBG obtained through division in space domain in combination with division in time domain and/or frequency domain, CBGs mapped to a same time-domain symbol and/or frequency-domain subband may be mapped according to the process, described in the foregoing embodiment of this application, of mapping a CBG to a corresponding transport layer (that is, space-domain mapping).

It should be noted that same or similar concepts or processes may be cited or combined in the foregoing different embodiments, and division of the different embodiments is merely intended to describe this application more clearly.

Optionally, the process of mapping a CBG to a corresponding transport layer in Embodiment 4 to Embodiment 6 of this application may be alternatively replaced with the mapping process in Embodiment 7 of this application (this is equivalent to replacing a DMRS port group with a transport layer group corresponding to each CBG, where the transport layer group is a set of transport layers to which the CBG is mapped). For the specific mapping process, refer to corresponding content in Embodiment 7 of this application. Details are not described herein again.

Optionally, Embodiment 7 of the data communication method in this application may be alternatively performed independently from any one of Embodiment 1 to Embodiment 6, without depending on the other embodiments. For example, the implementations, described in Embodiment 7 of the data communication method in this application, about mapping a CBG to a corresponding transport layer may also be applied to other data communication processes. This is not limited in this embodiment of this application.

Figure 8:
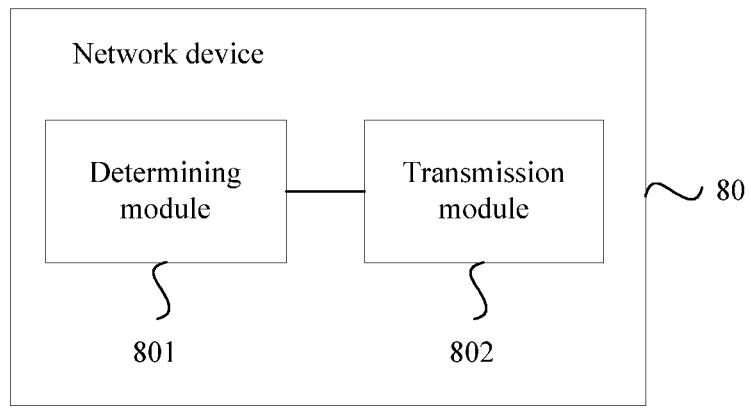
FIG. 8 is a schematic structural diagram of Embodiment 1 of a network device according to this application.

FIG. 8 is a schematic structural diagram of Embodiment 1 of a network device according to this application. As shown in FIG. 8, the network device 80 provided in this embodiment includes a determining module 801 and a communication module 802.

The determining module 801 is configured to determine demodulation reference signal DMRS port groups, where a quantity of the DMRS port groups is greater than or equal to 2.

The communication module 802 is configured to communicate data with a terminal device, where the data is corresponding to a transport block, the transport block is divided into at least one code block group CBG, and each of the at least one CBG is corresponding to one DMRS port group and is mapped to a transport layer corresponding to the one DMRS port group.

Optionally, that the transport block is divided into at least one CBG includes: the =transport block is divided into N code blocks CBs, where N=⌈B/c⌉, B represents a total quantity of bits of the transport block with an added redundancy check bit, c represents a preset value, and ⌈ ⌉ represents a round-up operation; and the N CBs are grouped into CBGs corresponding to the DMRS port groups.

Optionally, a quantity of CBs included in each CBG is equal to a value calculated based on the following formula: $\lceil(B_0/B_s) \times N\rceil$ or $\lfloor(B_0/B_s) \times N\rfloor$, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

Optionally, that the transport block is divided into at least one CBG includes: the transport block is divided into a transport sub-block corresponding to each DMRS port group; and each transport sub-block is encoded to obtain a CBG corresponding to the DMRS port group.

Optionally, the network device further includes: a notification module, configured to send a notification message to the terminal device, where the notification message carries configuration information of the DMRS port groups.

Optionally, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

Optionally, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

The network device in this embodiment may be configured to perform the technical solution in any one of Embodiment 1 to Embodiment 3, or Embodiment 7 of the data communication method in this application. Implementation principles and technical effects thereof are similar. Details are not described herein again.

Figure 9:
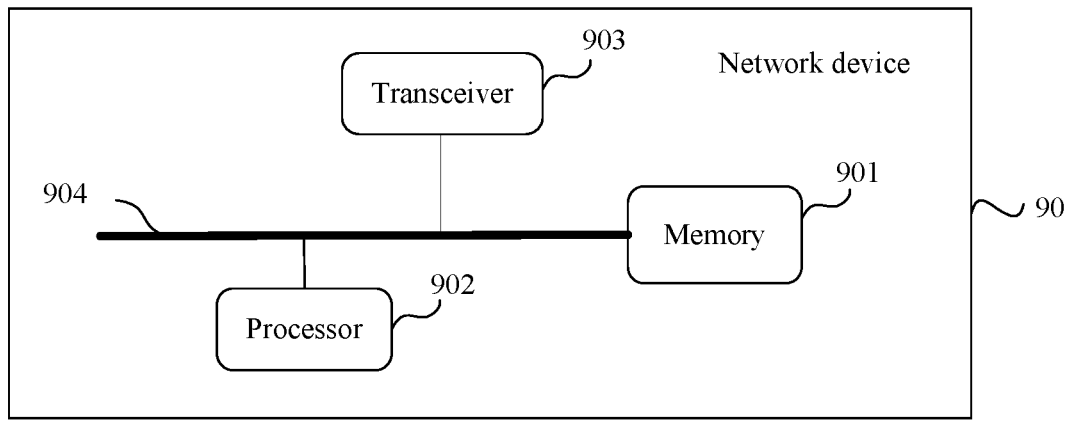
FIG. 9 is a schematic structural diagram of Embodiment 2 of a network device according to this application.

FIG. 9 is a schematic structural diagram of Embodiment 2 of a network device according to this application. As shown in FIG. 9, the network device 90 provided in this embodiment includes a memory 901, a processor 902, a transceiver 903, and at least one communications bus 904.

The communications bus 904 is configured to implement a communications connection between elements. The memory 901 may include a high-speed RAM, or may include a nonvolatile memory NVM, for example, at least one magnetic disk memory. The memory 901 may store various programs used to perform various processing functions and implement the method steps in the foregoing embodiments of this application. The transceiver 903 may be a corresponding input/output interface with a communication function. The processor 902 is configured to invoke a program instruction in the memory 901 to perform the following step: determining demodulation reference signal DMRS port groups, where a quantity of the DMRS port groups is greater than or equal to 2. The transceiver 903 is configured to communicate data with a terminal device, where the data is corresponding to a transport block, the transport block is divided into at least one code block group CBG, and each of the at least one CBG is corresponding to one DMRS port group and is mapped to a transport layer corresponding to the one DMRS port group.

Optionally, that the transport block is divided into at least one CBG includes: the transport block is divided into N code blocks CBs, where N=⌈B/c⌉, B represents a total quantity of bits of the transport block with an added redundancy check bit, c represents a preset value, and ⌈ ⌉ represents a round-up operation; and the N CBs are grouped into CBGs corresponding to the DMRS port groups.

Optionally, a quantity of CBs included in each CBG is equal to a value calculated based on the following formula: $\lfloor(B_0/B_s)\times N\rfloor$ or $\lceil(B_0/B_s)\times N\rceil$, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

Optionally, that the transport block is divided into at least one CBG includes: the transport block is divided into a transport sub-block corresponding to each DMRS port group; and each transport sub-block is encoded to obtain a CBG corresponding to the DMRS port group.

Optionally, the transceiver 903 is further configured to send a notification message to the terminal device, where the notification message carries configuration information of the DMRS port groups.

Optionally, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

Optionally, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

The network device in this embodiment may be configured to perform the technical solution in any one of Embodiment 1 to Embodiment 3, or Embodiment 7 of the data communication method in this application. Implementation principles and technical effects thereof are similar. Details are not described herein again.

Figure 10:
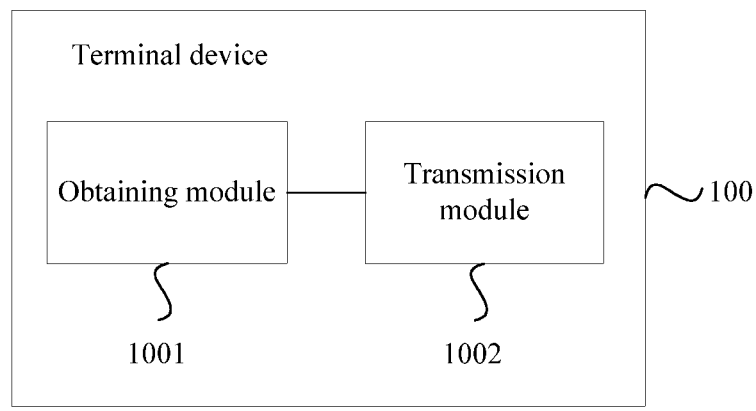
FIG. 10 is a schematic structural diagram of Embodiment 1 of a terminal device according to this application.

FIG. 10 is a schematic structural diagram of Embodiment 1 of a terminal device according to this application. As shown in FIG. 10, the terminal device 100 provided in this embodiment includes an obtaining module 1001 and a communication module 1002.

The obtaining module 1001 is configured to obtain configuration information of demodulation reference signal DMRS port groups, where a quantity of the DMRS port groups is greater than or equal to 2.

The communication module 1002 is configured to communicate data with a network device, where the data is corresponding to a transport block, the transport block is divided into at least one code block group CBG, and each of the at least one CBG is corresponding to one DMRS port group and is mapped to a transport layer corresponding to the one DMRS port group.

Optionally, that the transport block is divided into at least one CBG includes: the transport block is divided into N code blocks CBs, where N=⌈B/c⌉, B represents a total quantity of bits of the transport block with an added redundancy check bit, c represents a preset value, and ⌈ ⌉ represents a round-up operation; and the N CBs are grouped into CBGs corresponding to the DMRS port groups.

Optionally, a quantity of CBs included in each CBG is equal to a value calculated based on the following formula: $\lfloor(B_0/B_s)\times N\rfloor$ $\lceil(B_0/B_s)\times N\rceil$, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

Optionally, that the transport block is divided into at least one CBG includes: the transport block is divided into a transport sub-block corresponding to each DMRS port group; and each transport sub-block is encoded to obtain a CBG corresponding to the DMRS port group.

Optionally, the obtaining module is specifically configured to receive a notification message sent by the network device, where the notification message carries the configuration information of the DMRS port groups.

Optionally, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

Optionally, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence included in the CBG corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

The terminal device in this embodiment may be configured to perform the technical solution in any one of Embodiment 1 to Embodiment 3, or Embodiment 7 of the data communication method in this application. Implementation principles and technical effects thereof are similar. Details are not described herein again.

Figure 11:
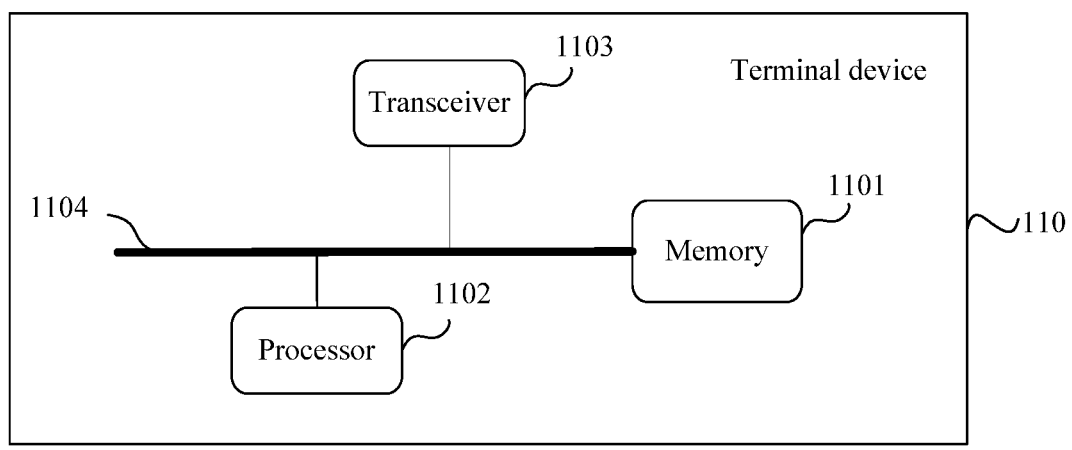
FIG. 11 is a schematic structural diagram of Embodiment 2 of a terminal device according to this application.

FIG. 11 is a schematic structural diagram of Embodiment 2 of a terminal device according to this application. As shown in FIG. 11, the terminal device no provided in this embodiment includes a memory 1101, a processor 1102, a transceiver 1103, and at least one communications bus 1104.

The communications bus 1104 is configured to implement a communications connection between elements. The memory 1101 may include a high-speed RAM, or may include a nonvolatile memory NVM, for example, at least one magnetic disk memory. The memory 1101 may store various programs used to perform various processing functions and implement the method steps in the foregoing embodiments of this application. The transceiver 1103 may be a corresponding input/output interface with a communication function. The processor 1102 is configured to invoke a program instruction in the memory 1101 to perform the following step: obtaining configuration information of demodulation reference signal DMRS port groups, where a quantity of the DMRS port groups is greater than or equal to 2. The transceiver 1103 is configured to communicate data with a network device, where the data is corresponding to a transport block, the transport block is divided into at least one code block group CBG, and each of the at least one CBG is corresponding to one DMRS port group and is mapped to a transport layer corresponding to the one DMRS port group.

Optionally, that the transport block is divided into at least one CBG includes: the transport block is divided into N code blocks CBs, where N=⌈B/c⌉, B represents a total quantity of bits of the transport block with an added redundancy check bit, c represents a preset value, and ⌈ ⌉ represents a round-up operation; and the N CBs are grouped into CBGs corresponding to the DMRS port groups.

Optionally, a quantity of CBs included in each CBG is equal to a value calculated based on the following formula: $\lfloor (B_0/B_s) \times N \rfloor$ or $\lceil (B_0/B_s) \times N \rceil$, where $B_0$ represents a quantity of bits of data sent through a DMRS port group corresponding to the CBG, $B_s$ represents a total quantity of bits of data sent through the DMRS port groups, ⌊ ⌋ represents a round-down operation, and ⌈ ⌉ represents a round-up operation.

Optionally, that the transport block is divided into at least one CBG includes: the transport block is divided into a transport sub-block corresponding to each DMRS port group; and each transport sub-block is encoded to obtain a CBG corresponding to the DMRS port group.

Optionally, the transceiver is further configured to receive a notification message sent by the network device, where the notification message carries the configuration information of the DMRS port groups. Correspondingly, the processor is further configured to obtain the configuration information of the DMRS port groups based on the notification message.

Optionally, that each of the at least one CBG is mapped to a transport layer corresponding to the one DMRS port group includes: a preset quantity of data bits are sequentially extracted in a first preset order from a data bit sequence included in a CBG corresponding to each DMRS port group, and serial concatenation is performed on the data bits to obtain a concatenated data bit sequence; and the concatenated data bit sequence is mapped to each transport layer according to a predefined mapping policy.

Optionally, that a preset quantity of data bits are sequentially extracted in a first preset order from a data bit sequence included in a CBG corresponding to each DMRS port group, and serial concatenation is performed on the data bits to obtain a concatenated data bit sequence includes: when extraction is performed m times on the data bit sequence included in the CBG corresponding to each DMRS port group to extract the entire data bit sequence, serial concatenation is sequentially performed on a first data bit sequence to an $m^{th}$ data bit sequence to obtain the concatenated data bit sequence, where m is a total quantity of times of performing extraction on the data bit sequence included in the CBG corresponding to each DMRS port group, and m is a positive integer greater than or equal to 2, where the first data bit sequence is a data bit sequence obtained by sequentially extracting first Qi data bits in a second preset order from the data bit sequence corresponding to each DMRS port group and performing serial concatenation on the first Qi data bits, where Qi represents a quantity of data bits extracted from a data bit sequence included in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence included in the CBG corresponding to each DMRS port group and performing serial concatenation on the first Qi data bits, where 2≤k≤m, and the remaining data bit sequence included in the CBG corresponding to the DMRS port group includes a data bit that remains after data bit extraction is performed k−1 times on the data bit sequence included in the CBG corresponding to the DMRS port group.

The terminal device in this embodiment may be configured to perform the technical solution in any one of Embodiment 1 to Embodiment 3, or Embodiment 7 of the data communication method in this application. Implementation principles and technical effects thereof are similar. Details are not described herein again.

In Embodiment 3 of a network device in this application, the network device includes a determining module and a communication module. Optionally, for a schematic structural diagram of the network device, refer to FIG. 8.

The determining module is configured to determine a quantity of transport layers.

The communication module is configured to communicate data with a terminal device, where the data is corresponding to a transport block, and the transport block is mapped to a corresponding transport layer based on the quantity of transport layers.

Optionally, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, the transport block is divided into two code block groups CBGs, and the two CBGs are mapped to different transport layers.

Optionally, the network device further includes: the determining module, configured to determine, based on that a difference between channel quantity information corresponding to different DMRS ports is greater than a preset threshold, to divide the transport block when the quantity of transport layers is equal to 3 or 4.

Optionally, the network device further includes: a sending module, configured to send a group configuration message to the terminal device, where the group configuration message is used to instruct to divide the transport block when the quantity of transport layers is equal to 3 or 4.

The network device in this embodiment may be configured to perform the technical solution in any one of Embodiment 4 to Embodiment 6, or Embodiment 7 of the data communication method in this application. Implementation principles and technical effects thereof are similar. Details are not described herein again.

In Embodiment 4 of a network device in this application, the network device includes a memory, a processor, a transceiver, and at least one communications bus. Optionally, for a schematic structural diagram of the network device, refer to FIG. 9.

The communications bus is configured to implement a communications connection between elements. The memory may include a high-speed RAM memory, or may include a nonvolatile memory NVM, for example, at least one magnetic disk memory. The memory may store various programs used to perform various processing functions and implement the method steps in the foregoing embodiments of this application. The transceiver may be a corresponding input/output interface with a communication function. The processor is configured to invoke a program instruction in the memory to perform the following step: determining a quantity of transport layers. The transceiver is configured to communicate data with a terminal device, where the data is corresponding to a transport block, and the transport block is mapped to a corresponding transport layer based on the quantity of transport layers.

Optionally, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, the transport block is divided into two code block groups CBGs, and the two CBGs are mapped to different transport layers.

Optionally, the processor is further configured to determine, based on that a difference between channel quantity information corresponding to different DMRS ports is greater than a preset threshold, to divide the transport block when the quantity of transport layers is equal to 3 or 4.

Optionally, the transceiver is further configured to send a group configuration message to the terminal device, where the group configuration message is used to instruct to divide the transport block when the quantity of transport layers is equal to 3 or 4.

The network device in this embodiment may be configured to perform the technical solution in any one of Embodiment 4 to Embodiment 6, or Embodiment 7 of the data communication method in this application. Implementation principles and technical effects thereof are similar. Details are not described herein again.

In Embodiment 3 of a terminal device in this application, the terminal device includes an obtaining module and a communication module. Optionally, for a schematic structural diagram of the terminal device, refer to FIG. 10.

The obtaining module is configured to obtain a quantity of transport layers.

The communication module is configured to communicate data with a network device, where the data is corresponding to a transport block, and the transport block is mapped to a corresponding transport layer based on the quantity of transport layers.

Optionally, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, and a group configuration message is used to instruct to divide the transport block, the transport block is divided into two code block groups CBGs, and the two CBGs are mapped to different transport layers.

Optionally, the terminal device further includes: a receiving module, configured to receive the group configuration message sent by the network device.

The terminal device in this embodiment may be configured to perform the technical solution in any one of Embodiment 4 to Embodiment 6, or Embodiment 7 of the data communication method in this application. Implementation principles and technical effects thereof are similar. Details are not described herein again.

In Embodiment 4 of a terminal device in this application, the terminal device includes a memory, a processor, a transceiver, and at least one communications bus. Optionally, for a schematic structural diagram of the terminal device, refer to FIG. 11.

The communications bus is configured to implement a communications connection between elements. The memory may include a high-speed RAM, or may include a nonvolatile memory NVM, for example, at least one magnetic disk memory. The memory may store various programs used to perform various processing functions and implement the method steps in the foregoing embodiments of this application. The transceiver may be a corresponding input/output interface with a communication function. The processor is configured to invoke a program instruction in the memory to perform the following step: obtaining a quantity of transport layers. The transceiver is configured to communicate data with a network device, where the data is corresponding to a transport block, and the transport block is mapped to a corresponding transport layer based on the quantity of transport layers.

Optionally, that the transport block is mapped to a corresponding transport layer based on the quantity of transport layers includes: if the quantity of transport layers is equal to 1 or 2, the transport block is mapped to the corresponding transport layer; or if the quantity of transport layers is equal to 3 or 4, and a group configuration message is used to instruct to divide the transport block, the transport block is divided into two code block groups CBGs, and the two CBGs are mapped to different transport layers.

Optionally, the transceiver is further configured to receive the group configuration message sent by the network device.

The terminal device in this embodiment may be configured to perform the technical solution in any one of Embodiment 4 to Embodiment 6, or Embodiment 7 of the data communication method in this application. Implementation principles and technical effects thereof are similar. Details are not described herein again.

It can be clearly understood by a person skilled in the art that, for convenience and brevity of description, division of the foregoing function modules is merely used as an example for description. In actual application, the foregoing functions may be allocated to different function modules and implemented according to a requirement, that is, an inner structure of an apparatus is divided into different function modules to implement all or some of the functions described above. For a detailed working process of the foregoing apparatuses, refer to a corresponding process in the foregoing method embodiments, and details are not described herein again.

In the several embodiments provided in this application, it should be understood that the disclosed apparatuses and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware in addition to a software functional unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of the present invention are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A data communication method comprising:
   determining, by a network device, demodulation reference signal (DMRS) port groups, wherein a quantity of the DMRS port groups is greater than or equal to 2; and
   communicating, by the network device, data with a terminal device, wherein the data is corresponding to a transport block, the transport block is divided into a plurality of code block groups (CBGs), and each of the plurality of CBGs corresponds to one of the DMRS port groups by having different DMRS port groups correspond to different ones of the plurality of CBGs without having one of the plurality of CBGs to correspond to multiple ones of the DMRS port groups, and each of the plurality of CBGs being mapped to a transport layer corresponding to the one of the DMRS port groups.

2. The method according to claim 1, wherein the transport block comprises an added redundancy check bit, wherein the transport block is divided into N code blocks (CBs), wherein $N=\lceil B/c \rceil$, B represents a total quantity of bits of the transport block with the added redundancy check bit, c represents a preset value, and $\lceil \ \rceil$ represents a round-up operation; and wherein the N CBs are grouped into CBGs corresponding to the DMRS port groups.

3. The method according to claim 2, wherein a quantity of CBs comprised in each of the plurality of CBGs is equal to a value calculated based on the following formula: $\lfloor (B_0/B_s) \times N \rfloor$ or $\lceil (B_0/B_s) \times N \rceil$, wherein $B_0$ represents a quantity of bits of data sent through a DMRS port group corresponding to the CBG, $B_s$ represents a total quantity of bits of data sent through the DMRS port groups, $\lfloor \rfloor$ represents a round-down operation, and $\lceil \rceil$ represents a round-up operation.

4. A data communication method comprising:
obtaining, by a terminal device, configuration information of demodulation reference signal (DMRS) port groups, wherein a quantity of the DMRS port groups is greater than or equal to 2; and
communicating, by the terminal device, data with a network device, wherein the data is corresponding to a transport block, the transport block is divided into a plurality of code block groups (CBGs), and each of the plurality of CBGs corresponds to one of the DMRS port groups by having different DMRS port groups correspond to different ones of the plurality of CBGs without having one of the plurality of CBGs to correspond to multiple ones of the DMRS port groups, wherein each of the plurality of CBGs is mapped to a transport layer corresponding to the one of the DMRS port groups.

5. The method according to claim 4, wherein the transport block comprises an added redundancy check bit, wherein the transport block is divided into N code blocks (CBs), wherein $N = \lceil B/c \rceil$, B represents a total quantity of bits of the transport block with the added redundancy check bit, c represents a preset value, and $\lceil \rceil$ represents a round-up operation; and the N CBs are grouped into CBGs corresponding to the DMRS port groups.

6. The method according to claim 5, wherein a quantity of CBs comprised in each CBG is equal to a value calculated based on the following formula: $\lfloor (B_0/B_s) \times N \rfloor$ or $\lceil (B_0/B_s) \times N \rceil$, wherein $B_0$ represents a quantity of bits of data sent through a DMRS port group corresponding to the CBG, $B_s$ represents a total quantity of bits of data sent through the DMRS port groups, $\lfloor \rfloor$ represents a round-down operation, and $\lceil \rceil$ represents a round-up operation.

7. The method according to claim 4, wherein the transport block is divided into a plurality of transport sub-blocks, each of the plurality of transport sub-blocks corresponding to each of the DMRS port groups; and
each of the plurality of transport sub-blocks is encoded to obtain the plurality of CBGs corresponding to one of the DMRS port groups.

8. The method according to claim 4, wherein obtaining the configuration information of the DMRS port groups comprises:
receiving, by the terminal device, a notification message sent by the network device, wherein the notification message carries the configuration information of the DMRS port groups.

9. The method according to claim 4, wherein:
a preset quantity of data bits are sequentially extracted in a first preset order from a data bit sequence comprised in a CBG corresponding to each of the DMRS port groups, and serial concatenation is performed on the data bits to obtain a concatenated data bit sequence; and the concatenated data bit sequence is mapped to each transport layer according to a predefined mapping policy.

10. The method according to claim 9, wherein that a preset quantity of data bits are sequentially extracted in a first preset order from a data bit sequence comprised in a CBG corresponding to each DMRS port group, and serial concatenation is performed on the data bits to obtain a concatenated data bit sequence comprises:
when extraction is performed m times on the data bit sequence comprised in the CBG corresponding to each of the DMRS port groups to extract all of the data bit sequence, serial concatenation is sequentially performed on a first data bit sequence to an $m^{th}$ data bit sequence to obtain the concatenated data bit sequence, wherein m is a total quantity of times of performing extraction on the data bit sequence comprised in the CBG corresponding to each of the DMRS port groups, and m is a positive integer greater than or equal to 2, wherein
the first data bit sequence is a data bit sequence obtained by sequentially extracting first Qi data bits in a second preset order from the data bit sequence comprised in the CBG corresponding to each of the DMRS port groups and performing serial concatenation on the first Qi data bits, wherein Qi represents a quantity of data bits extracted from a data bit sequence comprised in a CBG corresponding to an $i^{th}$ DMRS port group, $1 \leq i \leq R$, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and
a $k^{th}$ data bit sequence is a data bit sequence obtained by sequentially extracting first Qi data bits in the second preset order from a remaining data bit sequence comprised in the CBG corresponding to each of the DMRS port groups and performing serial concatenation on the first Qi data bits, wherein $2 \leq k \leq m$, and the remaining data bit sequence comprised in the CBG corresponding to the DMRS port group comprises a data bit that remains after data bit extraction is performed k−1 times on the data bit sequence comprised in the CBG corresponding to the DMRS port group.

11. An apparatus comprising:
a processor; and
a non-transitory computer-readable storage medium storing a program to be executed by the processor, the program including instructions for:
determining demodulation reference signal (DMRS) port groups, wherein a quantity of the DMRS port groups is greater than or equal to 2; and
communicating data with a terminal device, wherein the data is corresponding to a transport block, the transport block is divided into a plurality of code block groups (CBGs), and each of the plurality of CBGs is corresponding to one of the DMRS port groups by having different DMRS port groups correspond to different ones of the plurality of CBGs without having one of the plurality of CBGs to correspond to multiple ones of the DMRS port groups, wherein each of the plurality of CBGs is mapped to a transport layer corresponding to the one of the DMRS port groups.

12. The apparatus according to claim 11, wherein the program comprises instructions for an added redundancy check bit in the transport block, and dividing the transport block into N code blocks (CBs), wherein N=⌈B/c⌉, B represents a total quantity of bits of the transport block with the added redundancy check bit, c represents a preset value, and ⌈ ⌉ represents a round-up operation; and wherein the N CBs are grouped into CBGs corresponding to the DMRS port groups.

13. The apparatus according to claim 12, wherein a quantity of CBs comprised in each CBG is equal to a value calculated based on the following formula: $\lfloor (B_0/B_s) \times N \rfloor$ or $\lceil (B_0/B_s) \times N \rceil$, wherein $B_0$ represents a quantity of bits of data sent through a DMRS port group corresponding to the CBG, $B_s$ represents a total quantity of bits of data sent through the DMRS port groups, $\lfloor \rfloor$ represents a round-down operation, and $\lceil \rceil$ represents a round-up operation.

14. An apparatus, comprising:
a processor; and
a non-transitory computer-readable storage medium storing a program to be executed by the processor, the program including instructions for:
obtaining configuration information of demodulation reference signal (DMRS) port groups, wherein a quantity of the DMRS port groups is greater than or equal to 2; and
communicating data with a network device, wherein the data is corresponding to a transport block, the transport block is divided into a plurality of code block groups (CBGs), each of the plurality of CBGs corresponds to one of the DMRS port groups by having different DMRS port groups correspond to different ones of the plurality of CBGs without having one of the plurality of CBGs to correspond to multiple ones of the DMRS port groups, wherein each of the plurality of CBGs is mapped to a transport layer corresponding to the one of the DMRS port groups.

15. The apparatus according to claim 14, wherein the program includes instructions for adding an added redundancy check bit in the transport block, which is divided into N code blocks (CBs), wherein N=⌈B/c⌉, B represents a total quantity of bits of the transport block with the added redundancy check bit, c represents a preset value, and ⌈ ⌉ represents a round-up operation; and the N CBs are grouped into CBGs corresponding to the DMRS port groups.

16. The apparatus according to claim 15, wherein a quantity of CBs comprised in each CBG is equal to a value calculated based on the following formula: $\lfloor (B_0/B_s) \times N \rfloor$ or $\lceil (B_0/B_s) \times N \rceil$, wherein $B_0$ represents a quantity of bits of data sent through a DMRS port group corresponding to the CBG, $B_s$ represents a total quantity of bits of data sent through the DMRS port groups, $\lfloor \rfloor$ represents a round-down operation, and $\lceil \rceil$ represents a round-up operation.

17. The apparatus according to claim 14, wherein the program including instructions for:
dividing the transport block into a plurality of transport sub-blocks, each of the plurality of transport sub-blocks corresponding to each of the DMRS port groups; and
encoding each of the plurality of transport sub-blocks to obtain the plurality of CBGs corresponding to one of the DMRS port groups.

18. The apparatus according to claim 14, wherein the instructions for obtaining the configuration information comprise instructions for receiving a notification message sent by the network device, wherein the notification message carries the configuration information of the DMRS port groups.

19. The apparatus according to claim 14, wherein:
a preset quantity of data bits are sequentially extracted in a first preset order from a data bit sequence comprised in a CBG corresponding to each DMRS port group, and serial concatenation is performed on the data bits to obtain a concatenated data bit sequence; and
the concatenated data bit sequence is mapped to each transport layer according to a predefined mapping policy.

20. The apparatus according to claim 19, wherein that a preset quantity of data bits are sequentially extracted in a first preset order from a data bit sequence comprised in a CBG corresponding to each DMRS port group, and serial concatenation is performed on the data bits to obtain a concatenated data bit sequence comprises:
when extraction is performed m times on the data bit sequence comprised in the CBG corresponding to each DMRS port group to extract all of the data bit sequence, serial concatenation is sequentially performed on a first data bit sequence to an $m^{th}$ data bit sequence to obtain the concatenated data bit sequence, wherein m is a total quantity of times of performing extraction on the data bit sequence comprised in the CBG corresponding to each DMRS port group, and m is a positive integer greater than or equal to 2, wherein the first data bit sequence is a data bit sequence obtained by sequentially extracting first Qi data bits in a second preset order from the data bit sequence comprised in the CBG corresponding to each DMRS port group and performing serial concatenation on the first Qi data bits, wherein Qi represents a quantity of data bits extracted from a data bit sequence comprised in a CBG corresponding to an $i^{th}$ DMRS port group, 1≤i≤R, i is a positive integer, R is the quantity of the DMRS port groups, R is a positive integer greater than or equal to 2, $$Qi = \sum_{l=0}^{L_i} q_l,$$

$L_i$ is a quantity of transport layers corresponding to the $i^{th}$ DMRS port group, and $q_l$ is a modulation order corresponding to an $l^{th}$ transport layer; and a $k^{th}$ data bit sequence is a data bit sequence obtained by sequentially extracting first Qi data bits in the second preset order from a remaining data bit sequence comprised in the CBG corresponding to each DMRS port group and performing serial concatenation on the first Qi data bits, wherein 2≤k≤m, and the remaining data bit sequence comprised in the CBG corresponding to the DMRS port group comprises a data bit that remains after data bit extraction is performed k−1 times on the data bit sequence comprised in the CBG corresponding to the DMRS port group.

* * * * *